US012808597B2

(12) United States Patent
Park et al.

(10) Patent No.: US 12,808,597 B2
(45) Date of Patent: Nov. 24, 2026

(54) REFRIGERATOR

(71) Applicant: SAMSUNG ELECTRONICS CO., LTD., Suwon-si (KR)

(72) Inventors: Hosang Park, Suwon-si (KR); Jihoo Kim, Suwon-si (KR); Seunghyeok Son, Suwon-si (KR); Byoungjae Cho, Suwon-si (KR); Minseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 19/003,761

(22) Filed: Dec. 27, 2024

(65) Prior Publication Data

US 2026/0118045 A1 Apr. 30, 2026

Related U.S. Application Data

(63) Continuation of application No. PCT/KR2024/019559, filed on Dec. 3, 2024.

(30) Foreign Application Priority Data

Feb. 1, 2024 (KR) ........................ 10-2024-0015930
Apr. 25, 2024 (KR) ........................ 10-2024-0055732

(51) Int. Cl.
*F25D 23/02* (2006.01)
*E05D 7/081* (2006.01)
(Continued)

(52) U.S. Cl.
CPC ........... *F25D 23/028* (2013.01); *E05D 7/081* (2013.01); *E05D 11/06* (2013.01); *E05F 3/20* (2013.01);
(Continued)

(58) Field of Classification Search
CPC . F25D 23/028; F25D 2323/024; E05D 7/081; E05D 11/06; E05F 3/20; E05F 3/224; E05F 3/227; E05Y 2900/31
(Continued)

(56) References Cited

U.S. PATENT DOCUMENTS 3,546,736 A * 12/1970 Booth ..................... E05F 1/063 16/312
3,628,845 A * 12/1971 Grimm ................... E05F 1/063 16/312
(Continued)

FOREIGN PATENT DOCUMENTS

CN 113863807 12/2021
JP 7235613 3/2023
(Continued)

OTHER PUBLICATIONS

International Search Report and the Written Opinion of the International Searching Authority issued Mar. 25, 2025 for International Application No. PCT/KR2024/019559.

*Primary Examiner* — James O Hansen
(74) *Attorney, Agent, or Firm* — STAAS & HALSEY LLP

(57) ABSTRACT

A refrigerator including a cabinet; a door to open and close a storage compartment; a pusher to push the door in an opening direction; an elastic device configured to be compressed as the door is pushed by the pusher, and to transmit a compressed elastic force to the door to rotate the door farther in the opening direction; and a cam device including an upper cam and a lower cam, wherein the cam device is configured so that the upper cam is coupled to a lower portion of the door to be rotatable with the door, the lower cam is coupled to a lower hinge, and, after the elastic device transmits the compressed elastic force to the door, a first inclined surface of the upper cam slidably moves on a
(Continued)

second inclined surface of the lower cam to farther rotate the door in the opening direction.

15 Claims, 21 Drawing Sheets

(51) Int. Cl.

| | |
|---|---|
| ***E05D 11/06*** | (2006.01) |
| ***E05F 3/20*** | (2006.01) |
| ***E05F 3/22*** | (2006.01) |

(52) U.S. Cl.
CPC .............. *E05F 3/224* (2013.01); *E05F 3/227* (2013.01); *E05Y 2900/31* (2013.01)

(58) Field of Classification Search
USPC ........................................................... 312/405
See application file for complete search history.

(56) References Cited

U.S. PATENT DOCUMENTS

| | | | | |
|---|---|---|---|---|
| 5,500,984 | A | 3/1996 | Lee | |
| 7,555,815 | B2 * | 7/2009 | Tate, Jr. | E05D 3/022 16/221 |
| 8,454,102 | B2 * | 6/2013 | Kim | F25D 23/028 312/405 |
| 8,469,469 | B2 | 6/2013 | Kim et al. | |
| 8,578,557 | B2 * | 11/2013 | Yu | E05F 3/226 16/60 |
| 9,222,293 | B2 * | 12/2015 | Jenkinson | E05D 7/0027 |
| 10,704,309 | B2 * | 7/2020 | Sprague | E05D 5/0246 |
| 10,767,918 | B2 | 9/2020 | Kim et al. | |
| 2020/0393190 | A1 | 12/2020 | Choi et al. | |

FOREIGN PATENT DOCUMENTS

| | | |
|---|---|---|
| KR | 20-0118819 | 7/1998 |
| KR | 10-2011-0022849 | 3/2011 |
| KR | 10-1022900 | 3/2011 |
| KR | 10-2012-0135730 | 12/2012 |
| KR | 10-2020-0045798 | 5/2020 |
| KR | 10-2022-0132619 | 9/2022 |
| KR | 10-2516827 | 3/2023 |

* cited by examiner

REFRIGERATOR

CROSS-REFERENCE TO RELATED APPLICATIONS

This application is a continuation application of International Application No. PCT/KR2024/019559, filed on Dec. 3, 2024, which is based on and claims the benefit of Korean Patent Application Number 10-2024-0015930, filed on Feb. 1, 2024, and Korean Patent Application Number 10-2024-0055732, filed on Apr. 25, 2024, the disclosures of which are incorporated by reference herein in their entireties.

TECHNICAL FIELD

The disclosure relates to a refrigerator having an improved device for automatically opening a door.

BACKGROUND ART

In general, a refrigerator, an appliance for keeping food fresh, includes a cabinet having a storage compartment and a cold air supply device for supplying cold air to the storage compartment. The storage compartment includes a refrigerating compartment in which the food is kept refrigerated at a temperature of approximately 0° C. to 5° C., and a freezing compartment in which the food is kept frozen at a temperature of approximately 0° C. to −30° C. The cabinet is provided with a door at a front side to open and close the storage compartment. The door is rotatably mounted on the front side of the cabinet to open and close the storage compartment.

The refrigerator may include a device for automatically opening the door. The device for automatically opening the door may be operable by a touch sensor, a detection sensor, voice recognition, or the like. When the door is closed, the air inside the storage compartment is cooled, causing a temperature difference between the inside and outside of the storage compartment, and thus a pressure difference between the inside and outside of the storage compartment. In addition, the door may be in close contact with the cabinet through a gasket to allow the storage compartment to be sealed. Accordingly, opening the door may require a large amount of force at the beginning of the opening door.

When a user operates a device that opens the door, such as a touch sensor, a detection sensor, voice recognition, or the like, the door may be opened at a certain angle.

DISCLOSURE

Technical Problem

An aspect of the disclosure provides a refrigerator in which a door may be opened to a first angle by a pusher that automatically opens the door, further opened to a second angle by an elastic device, and further opened to a third angle by a cam device.

Further, an aspect of the disclosure provides a refrigerator capable of being stopped in a state in which a door is opened by a third angle by a cam device.

Further, an aspect of the disclosure provides a refrigerator having a guide shaft and a guide hole formed in an upper portion of a door to allow the door to be stopped in a state in which the door is opened by a third angle.

Technical tasks to be achieved in this document are not limited to the technical tasks mentioned above, and other technical tasks not mentioned will be clearly understood by those skilled in the art from the description below.

Technical Solution

Aspects of embodiments of the disclosure will be set forth in part in the description which follows and, in part, will be apparent from the description, or may be learned by practice of the presented embodiments.

According to an embodiment of the disclosure, a refrigerator may include a cabinet including a storage compartment; a lower hinge module; a door coupled to the cabinet by the lower hinge module, and configured to be rotatable to open and close the storage compartment; a pusher configured to push the door, when the storage compartment is closed, so that the door is rotated in an opening direction; an elastic device configured to be compressed as the door is rotated by a first angle by being pushed by the pusher, and to transmit a compressed elastic force to the door so that the door is rotated farther than the first angle in the opening direction; and a cam device including an upper cam with a first inclined surface, and a lower cam with a second inclined surface. The cam device may be configured so that the upper cam is coupled to a lower portion of the door so as to be rotatable together with the door, the lower cam is coupled to the lower hinge module, and, after the elastic device transmits the compressed elastic force to the door, the first inclined surface of the upper cam slidably moves on the second inclined surface of the lower cam to farther rotate the door in the opening direction.

According to an embodiment of the disclosure, the upper cam may include a first planar portion at a first side of the first inclined surface, a second planar portion at a second side of the first inclined surface, and a locking portion at a side of the first planar portion opposite to the first inclined surface.

According to an embodiment of the disclosure, the lower cam may include a third planar portion at a first side of the second inclined surface, a fourth planar portion at a second side of the second inclined surface, and a stopper at a side of the fourth planar portion opposite to the second inclined surface.

According to an embodiment of the disclosure, the first planar portion may contact the third planar portion based on the storage compartment being closed by the door.

According to an embodiment of the disclosure, in response to the door being rotated by the pusher by the first angle, the upper cam may be rotated by the first angle in the opening direction while maintaining a state in which the first planar portion of the upper cam is in contact with the third planar portion of the lower cam.

According to an embodiment of the disclosure, in response to the door being rotated by the elastic device from the first angle to a second angle greater than the first angle, while the door is rotated from the first angle to the second angle the upper cam may be rotated such that the first planar portion of the upper cam slidably moves along the second inclined surface of the lower cam.

According to an embodiment of the disclosure, in response to the door being rotated to the second angle by the elastic device, the upper cam may be rotated as the first inclined surface of the upper cam slidably moves along the second inclined surface of the lower cam, thereby farther rotating the door in the opening direction.

According to an embodiment of the disclosure, in response to the first inclined surface of the upper cam slidably moving along the second inclined surface of the lower cam, and then the first planar portion of the upper cam contacting the fourth planar portion of the lower cam, the upper cam may stop rotating and the door may stop in a state where the door is rotated by a third angle in the opening direction.

According to an embodiment of the disclosure, in response to a rotational force being transmitted to the door in the opening direction while the door is rotated by the third angle in the opening direction, the upper cam may be rotated such that the first planar portion moves along the fourth planar portion until the locking portion of the upper cam contacts the stopper of the lower cam to stop rotation of the door in a fully open state.

According to an embodiment of the disclosure, the cabinet may include an upper hinge module coupled to an upper portion of the cabinet, the upper hinge module including a hinge shaft to which the door is coupled to the cabinet so as to be rotatable. The door may include a door cap coupled to an upper portion of the door, and the door cap including a hinge hole to receive the hinge shaft.

According to an embodiment of the disclosure, the upper hinge module may include a guide shaft protruding toward the door. The door cap may include a guide hole formed along a circumference of the hinge hole to receive the guide shaft, and configured to be guided by the guide shaft in response to rotation of the door to open and close the storage compartment.

According to an embodiment of the disclosure, a width of the guide hole may gradually decrease in a direction from a front of the door toward a rear of the door.

According to an embodiment of the disclosure, the guide hole may include a first portion closest to the front of the door and where the width of the guide hole is largest, a second portion closest to the rear of the door and where the width of the guide hole is smallest, and a third portion formed between the first portion and the second portion, and where the width of the guide hole is equal to a thickness of the guide shaft.

According to an embodiment of the disclosure, based on the door being positioned to close the storage compartment, the guide shaft may be positioned at the first portion of the guide hole. Based on the door being rotated to open the storage compartment, the guide hole may be moved along the guide shaft so that a position of the guide shaft changes from the first portion to the third portion. Based on the door being rotated in the opening direction by the cam device, the guide hole may be moved along the guide shaft until movement of the guide hole is restricted based on the guide shaft being positioned at the second portion.

According to an embodiment of the disclosure, based on a rotational force being transmitted to the door in the opening direction while the guide shaft is positioned at the third portion, the guide hole may be moved along the guide shaft until the guide shaft is in the second portion, and farther rotational movement of the door in the opening direction may then be restricted based on the guide shaft being positioned at the second portion.

According to an embodiment of the disclosure, a refrigerator may include a cabinet including a storage compartment, a door rotatably coupled to the cabinet and configured to open or close the storage compartment, a pusher movable in a forward-to-backward direction on the cabinet and configured to push the door such that the door is opened by a first angle, an elastic device configured to be compressed in response to the door being opened by the pusher and transmit the compressed elastic force to the door such that the door is opened by a second angle greater than the first angle, and a cam device at a lower portion of the door and configured to transmit an additional opening force to the door such that the door opened by the elastic device is opened by a third angle greater than the second angle.

DESCRIPTION OF DRAWINGS

These and/or other aspects of the disclosure will become apparent and more readily appreciated from the following description of embodiments, taken in conjunction with the accompanying drawings listed below.

MODES OF THE INVENTION

Figure 1:
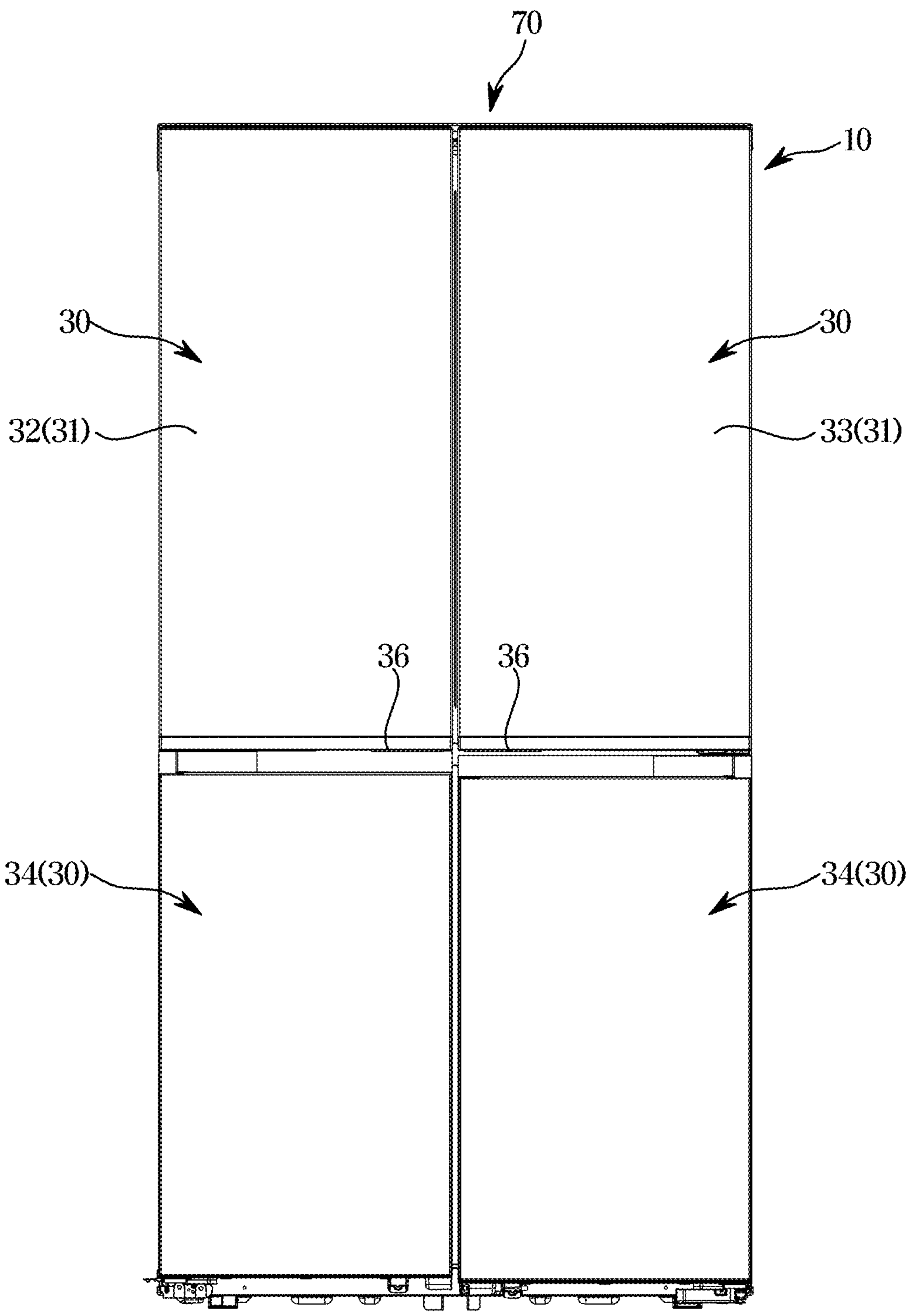
FIG. 1 is a view illustrating a front of a refrigerator, according to an embodiment of the disclosure.

Various embodiments of the disclosure and terms used herein are not intended to limit the technical features described herein to specific embodiments, and should be understood to include various modifications, equivalents, or substitutions of the corresponding embodiments.

In describing of the drawings, similar reference numerals may be used for similar or related elements.

The singular form of a noun corresponding to an item may include one or more of the items unless clearly indicated otherwise in a related context.

In the disclosure, phrases, such as “A or B”, “at least one of A and B”, “at least one of A or B”, “A, B or C”, “at least one of A, B and C”, and “at least one of A, B, or C” may include any one or all possible combinations of the items listed together in the corresponding phrase among the phrases.

As used herein, the term “and/or” includes any and all combinations of one or more of the associated listed items.

Terms such as “1st”, “2nd”, “primary”, or “secondary” may be used simply to distinguish an element from other elements, without limiting the element in other aspects (e.g., importance or order).

Further, as used in the disclosure, the terms “front”, “rear”, “top”, “bottom”, “side”, “left”, “right”, “upper”, “lower”, and the like are defined with reference to the drawings, and are not intended to limit the shape and position of any element.

It will be understood that when the terms “includes”, “comprises”, “including”, and/or “comprising” are used in the disclosure, they specify the presence of the specified features, figures, steps, operations, components, members, or combinations thereof, but do not preclude the presence or addition of one or more other features, figures, steps, operations, components, members, or combinations thereof.

When a given element is referred to as being “connected to”, “coupled to”, “supported by” or “in contact with” another element, it is to be understood that it may be directly or indirectly connected to, coupled to, supported by, or in contact with the other element. When a given element is indirectly connected to, coupled to, supported by, or in contact with another element, it is to be understood that it may be connected to, coupled to, supported by, or in contact with the other element through a third element.

It will also be understood that when an element is referred to as being “on” another element, it may be directly on the other element or intervening elements may also be present.

A refrigerator according to an embodiment of the disclosure may include a cabinet.

The “cabinet” may include an inner case, an outer case positioned outside the inner case, and an insulation provided between the inner case and the outer case.

The “inner case” may include a case, a plate, a panel, or a liner forming a storage compartment (also referred to as a storage room). The inner case may be formed as one body, or may be formed by assembling a plurality of plates together. The “outer case” may form an appearance of the cabinet, and be coupled to an outer side of the inner case such that the insulation is positioned between the inner case and the outer case.

The “insulation” may insulate an inside of the storage compartment from an outside of the storage compartment to maintain inside temperature of the storage compartment at appropriate temperature without being influenced by an external environment of the storage compartment. According to an embodiment of the disclosure, the insulation may include a foaming insulation. The foaming insulation may be molded by fixing the inner case and the outer case with jigs, etc., and then injecting and foaming urethane foam as a mixture of polyurethane and a foaming agent between the inner case and the outer case.

According to an embodiment of the disclosure, the insulation may include a vacuum insulation in addition to a foaming insulation, or may be configured only with a vacuum insulation instead of a forming insulation. The vacuum insulation may include a core material and a cladding material accommodating the core material and sealing the inside with vacuum or pressure close to vacuum. However, the insulation is not limited to the above-mentioned foaming insulation or vacuum insulation, and may include various materials capable of being used for insulation.

The “storage compartment” may include a space defined by the inner case. The storage compartment may further include the inner case defining the space corresponding to the storage compartment. The storage compartment may store a variety of items, such as food, medicines, cosmetics, and the like, and the storage compartment may be configured to be open on at least one side for insertion and removal of the items.

The refrigerator may include one or more storage compartments. In a case in which two or more storage compartments are formed in the refrigerator, the respective storage compartments may have different purposes of use, and may be maintained at different temperatures. To this end, the respective storage compartments may be partitioned by a partition wall including an insulation.

The storage compartment may be maintained within an appropriate temperature range according to a purpose of use, and may include a “refrigerating compartment”, a “freezing compartment”, and a “temperature conversion compartment” according to purposes of use and/or temperature ranges. The refrigerating compartment may be maintained at an appropriate temperature to keep food refrigerating, and the freezing compartment may be maintained at an appropriate temperature to keep food frozen. The “refrigerating” may be keeping food cold without freezing the food, and for example, the refrigerating compartment may be maintained within a range of 0 degrees Celsius to 7 degrees Celsius. The “freezing” may be freezing food or keeping food frozen, and for example, the freezing compartment may be maintained within a range of −20 degrees Celsius to −1 degrees Celsius. The temperature conversion compartment may be used as either a refrigerating compartment or a freezing compartment according to or regardless of a user’s selection.

The storage compartment may also be referred to by various terms, such as “vegetable compartment”, “freshness compartment”, “cooling compartment”, and “ice-making compartment”, in addition to “refrigerating compartment”, “freezing compartment”, and “temperature conversion compartment”, and the terms, such as “refrigerating compartment”, “freezing compartment”, “temperature conversion compartment”, etc., as used below are to be understood as representing storage compartments having the corresponding purposes of use and the corresponding temperature ranges.

The refrigerator according to an embodiment of the disclosure may include at least one door configured to open or close the open side of the storage compartment. The respective doors may be provided to open and close one or more storage compartments, or a single door may be provided to open and close a plurality of storage compartments. The door may be rotatably or slidably mounted to the front of the cabinet.

The “door” may seal the storage compartment in a closed state. The door, like the cabinet, may include an insulation to insulate the storage compartment in a closed state.

According to an embodiment, the door may include an outer door plate forming the front surface of the door, an inner door plate forming the rear surface of the door and facing the storage compartment, an upper cap, a lower cap, and a door insulation provided therein.

A gasket may be provided on the edge of the inner door plate to seal the storage compartment by coming into close contact with the front surface of the cabinet when the door is closed. The inner door plate may include a dyke that protrudes rearward to allow a door basket for storing items to be fitted.

According to an embodiment, the door may include a door body and a front panel that is detachably coupled to the front of the door body and forming the front surface of the door. The door body may include an outer door plate forming the front surface of the door body, an inner door plate forming the rear surface of the door body and facing the storage compartment, an upper cap, a lower cap, and a door insulator provided therein.

The refrigerator may be classified as French Door Type, Side-by-side Type, Bottom Mounted Freezer (BMF), Top Mounted Freezer (TMF), or Single Door Refrigerator according to the arrangement of the doors and the storage compartments.

The refrigerator according to an embodiment of the disclosure may include a cold air supply device for supplying cold air to the storage compartment.

The "cold air supply device" may include a machine, an apparatus, an electronic device, and/or a combination system thereof, capable of generating cold air and guiding the cold air to cool the storage compartment.

According to an embodiment of the disclosure, the cold air supply device may generate cold air through a cooling cycle including compression, condensation, expansion, and evaporation processes of refrigerants. To this end, the cold air supply device may include a refrigeration cycle device having a compressor, a condenser, an expander, and an evaporator to drive the refrigeration cycle. According to an embodiment of the disclosure, the cold air supply device may include a semiconductor, such as a thermoelectric element. The thermoelectric element may cool the storage compartment by heating and cooling actions through the Peltier effect.

The refrigerator according to an embodiment of the disclosure may include a machine compartment in which at least some components belonging to the cold air supply device are installed.

The "machine compartment" may be partitioned and insulated from the storage compartment to prevent heat generated by the components installed in the machine compartment from being transferred to the storage compartment. To dissipate heat from the components installed in the machine compartment, the machine compartment may communicate with outside of the cabinet.

The refrigerator according to an embodiment of the disclosure may include a dispenser provided on the door to provide water and/or ice. The dispenser may be provided on the door to allow access by the user without opening the door.

The refrigerator according to an embodiment of the disclosure may include an ice-making device that produces ice. The ice-making device may include an ice-making tray that stores water, an ice-moving device that separates ice from the ice-making tray, and an ice-bucket that stores ice produced in the ice-making tray.

The refrigerator according to an embodiment of the disclosure may include a controller for controlling the refrigerator.

The "controller" may include a memory for storing and/or recording data and/or programs for controlling the refrigerator, and a processor for outputting control signals for controlling the cold air supply device, etc. in accordance with the programs and/or data stored in the memory.

The memory may store or record various information, data, instructions, programs, and the like necessary for operation of the refrigerator. The memory may store temporary data generated while generating control signals for controlling components included in the refrigerator. The memory may include at least one of a volatile memory or a non-volatile memory, or a combination thereof.

The processor may control the overall operation of the refrigerator. The processor may control the components of the refrigerator by executing programs stored in memory. The processor may include a separate neural processing unit (NPU) that performs an artificial intelligence (AI) model operation. In addition, the processor may include a central processing unit (CPU), a graphics processor (GPU), and the like. The processor may generate a control signal to control the operation of the cold air supply device. For example, the processor may receive temperature information of the storage compartment from a temperature sensor and generate a cooling control signal to control an operation of the cold air supply device based on the temperature information of the storage compartment.

Furthermore, the processor may process a user input of a user interface and control an operation of the user interface in accordance with the programs and/or data memorized/stored in the memory. The user interface may be provided with an input interface and an output interface. The processor may receive the user input from the user interface. In addition, the processor may transmit a display control signal and image data for displaying an image on the user interface to the user interface in response to the user input.

The processor and memory may be provided integrally or may be provided separately. The processor may include one or more processors. For example, the processor may include a main processor and at least one sub-processor. The memory may include one or more memories.

The refrigerator according to an embodiment of the disclosure may include a processor and a memory for controlling all of the components included in the refrigerator, and may include a plurality of processors and a plurality of memories for individually controlling the components of the refrigerator. For example, the refrigerator may include a processor and a memory for controlling the operation of the cold air supply device in accordance with to an output of the temperature sensor. In addition, the refrigerator may be separately provided with a processor and a memory for controlling the operation of the user interface in accordance with the user input.

A communication module may communicate with external devices, such as servers, mobile devices, and other home appliances via a nearby access point (AP). The AP may connect a local area network (LAN) to which a refrigerator or a user device is connected to a wide area network (WAN) to which a server is connected. The refrigerator or the user device may be connected to the server via the WAN.

The input interface may include keys, a touch screen, a microphone, and the like. The input interface may receive the user input and pass the received user input to the processor.

The output interface may include a display, a speaker, and the like. The output interface may output various notifications, messages, information, and the like generated by the processor.

Hereinafter, various embodiments according to the disclosure will be described in detail with reference to the accompanying drawings.

Figure 2:
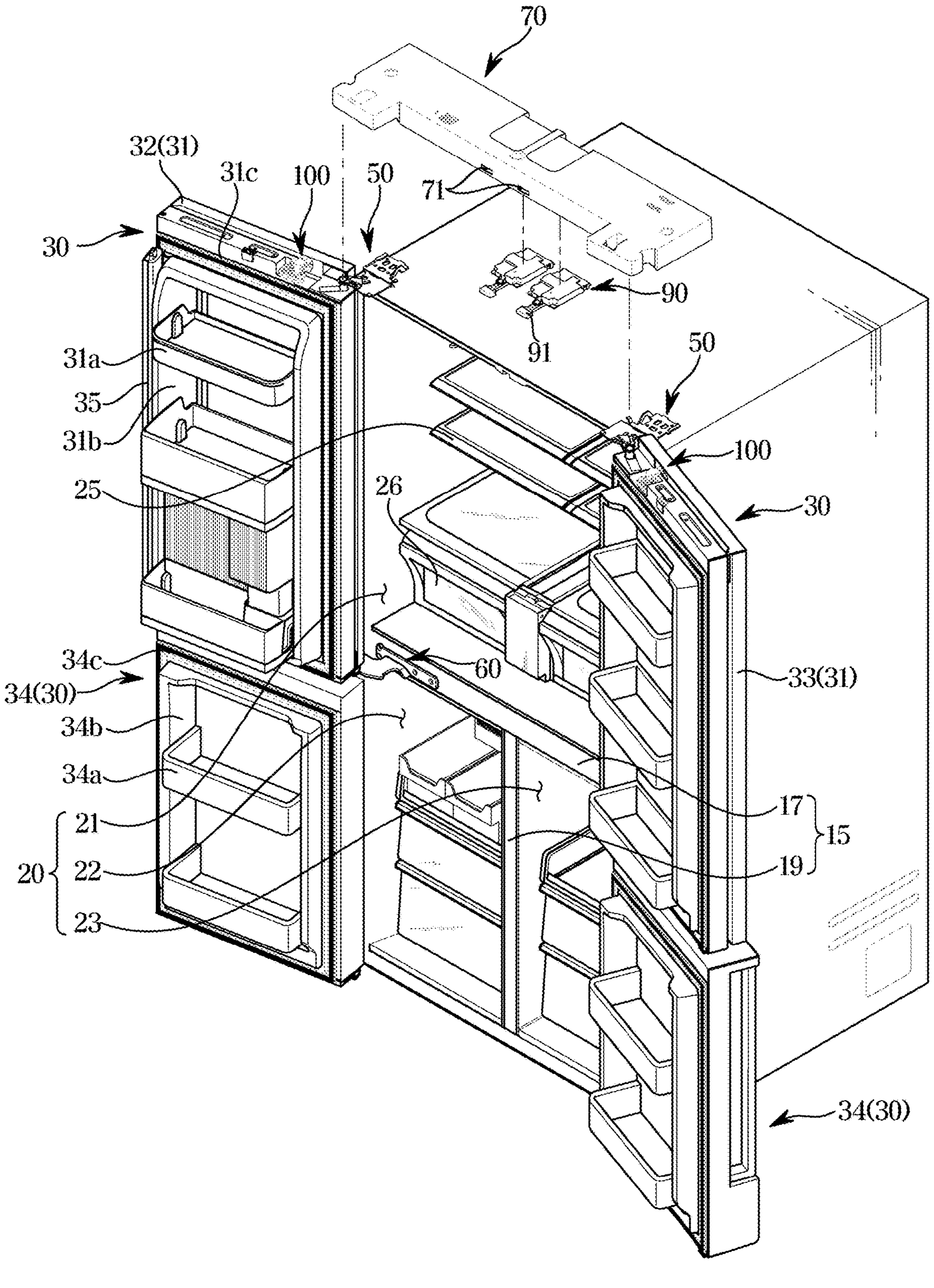
FIG. 2 is a view of the refrigerator with an open door, according to an embodiment of the disclosure.

FIG. 1 is a view showing a front of a refrigerator according to an embodiment. FIG. 2 is a view showing the refrigerator with an open door according to an embodiment.

As shown in FIGS. 1 and 2, the refrigerator may include a cabinet 10, a storage compartment 20 formed by being vertically divided within the cabinet 10, a door 30 configured to open or close the storage compartment 20, and a cold air supply device (not shown) configured to supply cold air to the storage compartment 20.

The cabinet 10 may include an inner case forming the storage compartment 20, an outer case coupled to an outer side of the inner case to form an exterior thereof, and an insulation (not shown) foamed between the inner case and the outer case to thermally insulate the storage compartment 20.

A machine compartment (not shown) in which a compressor (not shown) for compressing refrigerant and a condenser (not shown) for condensing the refrigerant compressed by the compressor are installed may be disposed in a lower rear side of the cabinet 10.

The cold air supply device may include a compressor installed in the machine compartment to compress refrigerant, a condenser installed in the machine compartment to condense refrigerant, an expansion valve (not shown) to expand the refrigerant condensed by the condenser, an evaporator (not shown) installed at the rear side of the storage compartment 20 to generate cold air, a fan (not shown) to induce the cold air generated by the evaporator to be discharged into the storage compartment 20, and a cold air duct (not shown) installed at the rear side of the storage compartment 20 to discharge the cold air induced by the fan into the storage compartment 20. The evaporator, the fan, and the cold air duct at the rear side of the storage compartment 20 may each be arranged at the rear side of a refrigerating compartment 21 and freezing compartments 22 and 23.

The storage compartment 20 may be divided into a plurality of compartments by partitions 15, and a plurality of shelves 25 and storage containers 26 may be provided inside the storage compartment 20 to store food and the like.

The storage compartment 20 may be divided into a plurality of storage compartments 21, 22 and 23 by the partition 15, and the partition 15 may include a first partition 17 that is coupled horizontally within the storage compartment 20 to divide the storage compartment 20 into an upper storage compartment 21 and lower storage compartments 22 and 23, and a second partition 19 that is coupled vertically to the lower storage compartments 22 and 23 to divide the lower storage compartments 22 and 23 into a first storage compartment 22 and a second storage compartment 23.

The partition 15 having a T-shape, in which the first partition 17 and the second partition 19 are coupled, may divide the storage compartment 20 into three spaces. Of the upper storage compartment 21 and the lower storage compartments 22 and 23 divided by the first partition 17, the upper storage compartment 21 may be used as a refrigerating compartment, and the lower storage compartments 22 and 23 may be used as freezing compartments.

The lower storage compartments 22 and 23 may be used entirely as freezing compartments, but the first storage compartment 22 may be used as a freezing compartment and the second storage compartment 23 may be used as a refrigerating compartment, or the first storage compartment 22 may be used as a freezing compartment and the second storage compartment 23 may be used either as a freezing compartment or as a refrigerating compartment.

Such a division of the storage compartment 20 as described above is only an example, and each storage compartment 21, 22 and 23 may be used differently from the above configuration.

The refrigerating compartment 21 and the freezing compartments 22 and 23 may be opened or closed by the doors 30 rotatably coupled to the cabinet 10.

The doors 30 may include a pair of refrigerating compartment doors 31 rotatably coupled to the cabinet 10 to open or close the refrigerating compartment 21. The pair of refrigerating compartment doors 31 may include a first door 32 and a second door 33 rotatably coupled to the left and right sides of the cabinet 10. The doors 30 may include a pair of freezing compartment doors 34 rotatably coupled to the cabinet 10 to open or close the freezing compartments 22 and 23. The doors that open and close the freezing compartments 22 and 23 may be sliding doors.

The refrigerating compartment 21 may be opened and closed by the pair of refrigerating compartment doors 31, and when the pair of refrigerating compartment doors 31 are closed, at least one of the first door 32 and the second door 33 may be provided with a rotating bar 35 such that a gap between the first door 32 and the second door 33 is not created and is sealed. The rotating bar 35 may be rotatably coupled to at least one of the pair of refrigerating compartment doors 31. The rotating bar 35 may be guided to rotate in response to opening or closing of the refrigerating compartment door 31 by a rotation guide formed on the cabinet 10.

A touch sensor 36 may be provided on a lower surface of the first door 32 and the second door 33, respectively. In response to a user touching the touch sensor 36, a device for automatically opening the first door 32 and the second door 33 may be operated. Although the touch sensor 36 is shown in the drawings as actuating the device for automatically opening the first door 32 and the second door 33, the present disclosure is not limited thereto. For example, the device for automatically opening the first door 32 and the second door 33 may be operated by a detection sensor, voice recognition, or the like.

The pair of refrigerating compartment doors 31 and the pair of freezing compartment doors 34 may each be provided with door baskets **31*a* and 34*a*** for storing food on a rear surface.

The door baskets **31*a* and 34*a* may include respective dykes 31*b* and 34*b* extending vertically from the respective doors 31 and 34 to support the respective door baskets 31*a* and 34*a* on both the left and right sides of the respective door baskets 31*a* and 34*a*. The dykes 31*b* and 34*b* may be arranged to extend from the respective doors 31 and 34. The dykes 31*b* and 34*b* may be provided in a separate configuration so as to be detachable from each door 31 and 34**.

In addition, gaskets **31*c* and 34*c* may be provided at a back edge of the respective doors 31 and 34 to seal the gap with the cabinet 10 when the respective doors 31 and 34 are closed. The gaskets 31*c* and 34*c* may be installed in the form of a loop along an edge on the rear surface of the respective doors 31 and 34**, respectively, and may include a magnet (not shown) therein.

The cabinet 10 may include hinge modules 50 and 60 that rotatably couple the refrigerating compartment door 31 to the cabinet 10. The hinge modules 50 and 60 may include an upper hinge module 50 coupled to an upper portion of the cabinet 10 to allow the refrigerating compartment door 31 to be rotatably coupled to the cabinet 10. The hinge modules 50 and 60 may include a lower hinge module 60 coupled to the first partition 17 to allow the refrigerating compartment door 31 to be rotatably coupled to the cabinet 10.

A top table 70 may be provided on an upper surface of the cabinet 10. The top table 70 may cover at least a portion of the upper hinge module 50 so that the upper hinge module 50 is not exposed to the outside.

A door opening device 90 for opening the refrigerating compartment door 31 may be provided inside the top table 70. A portion of the door opening device 90 may be received in the top table 70. The top table 70 may be coupled to the upper surface of the cabinet 10 with a portion of the door opening devices 90 coupled to the top table 70. The door opening devices 90 may be provided in a pair corresponding to the first door 32 and the second door 33 provided on the left and right sides of the cabinet 10, respectively.

For ease of description, the refrigerating compartment door 31 will be referred to and described herein as the door 30.

The door opening device 90 may include a pusher 91 configured to open the door 30 by pushing the rear surface of the door 30. The pusher 91 may be movable in a forward and backward direction. When the forwardly movable pusher 91 pushes against the rear surface of the door 30, the door 30 may be opened. In other words, the door opening device 90 may partially open the door 30 to a certain extent to allow a user to open the door 30 with a small force.

Although the door opening device 90 is shown in the drawings as being arranged in the cabinet 10 and the pusher 91 may push the rear surface of the door 30, the present disclosure is not limited thereto. In other words, the door opening device 90 may also be arranged in the door 30 and thus the pusher 91 may push the front surface of the cabinet 10 to open the door 30.

A pusher hole 71 may be formed in a front surface of the top table 70 through which the pusher 91 passes. Since the door opening device 90 is provided in a pair, the pushers 91 may also be provided in a pair. Accordingly, the pusher holes 71 may also be formed in a pair corresponding to the number of pushers 91.

An elastic device 100, which accumulates an elastic force by coming into contact with a cam 150 coupled to the upper hinge module 50 coupled to the cabinet 10 when the door 30 is opened by the pushers 91, may be coupled to an upper portion of the door 30. In other words, in the process of the door 30 being opened by the pushers 91, the elastic device 100 may accumulate an elastic force and transmit the accumulated elastic force to the door 30, thereby allowing the door 30 to be opened further than when the door 30 is opened by the pushers 91.

The upper hinge module 50 coupled to the upper portion of the cabinet 10 may be coupled with the cam 150 that causes the elastic device 100 to contact and accumulate an elastic force when the door 30 is opened by the pushers 91.

Although the drawings show the elastic device 100 being coupled to the upper portion of the door 30 and the cam 150 being coupled to the upper hinge module 50 coupled to the upper portion of the cabinet 10, the present disclosure is not limited thereto. In other words, the elastic device 100 and the cam 150 may be coupled to the lower portion of the door 30 and the lower hinge module 60 coupled to the first partition 17 of the cabinet 10, respectively.

Furthermore, although the drawings show that the elastic device 100 is coupled to the upper portion of the door 30 and the cam 150 is coupled to the upper hinge module 50 coupled to the upper portion of the cabinet 10, the present disclosure is not limited thereto. In other words, the elastic device 100 may be coupled to the upper hinge module 50 coupled to the upper portion of the cabinet 10, and the cam 150 may be coupled to the upper portion of the door 30.

A more detailed description of the elastic device 100 and the cam 150 will be given below.

Figure 3:
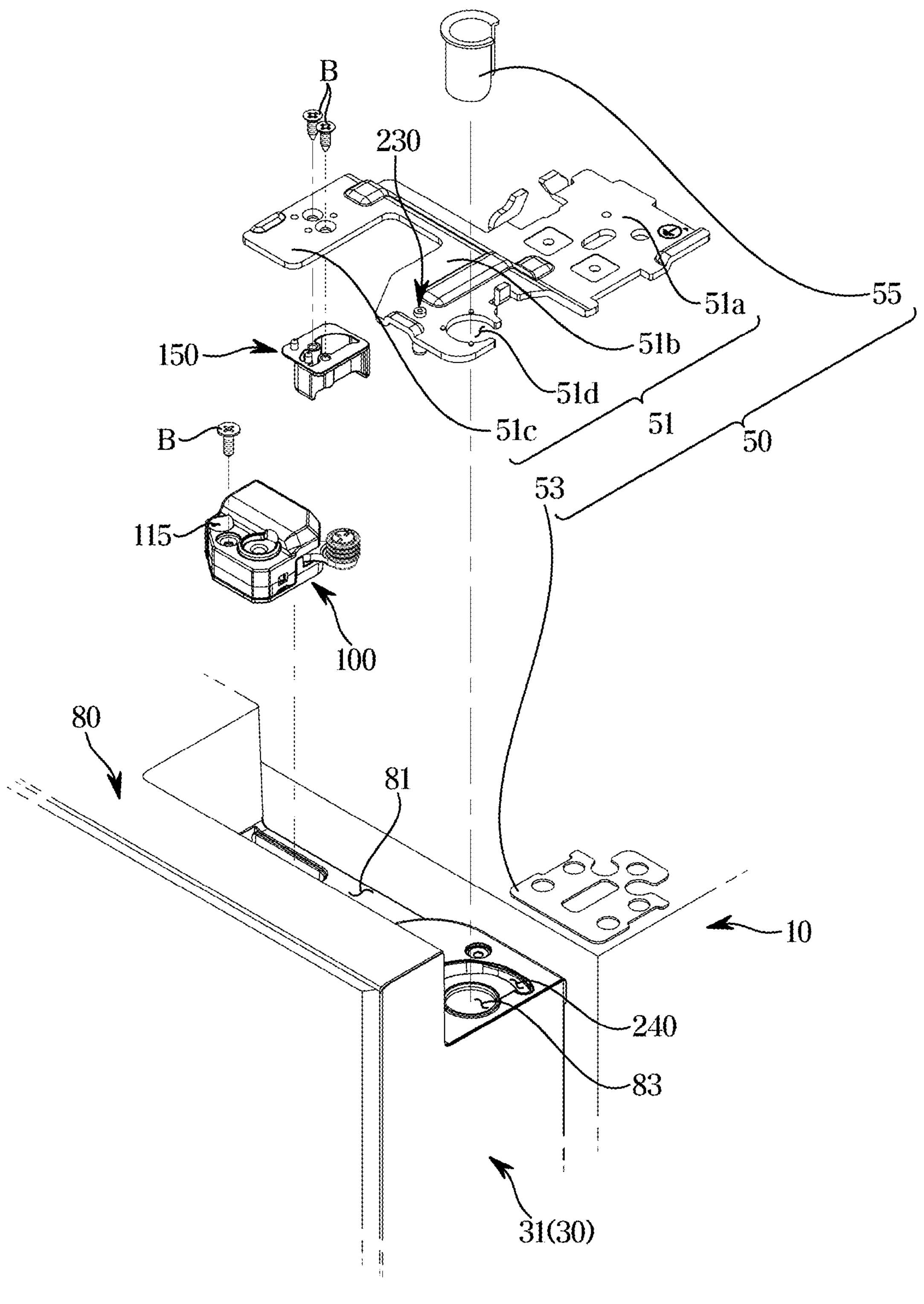
FIG. 3 is a view illustrating a cam coupled to an upper hinge module and an elastic device coupled to a door cap, according to an embodiment of the disclosure.
Figure 4:
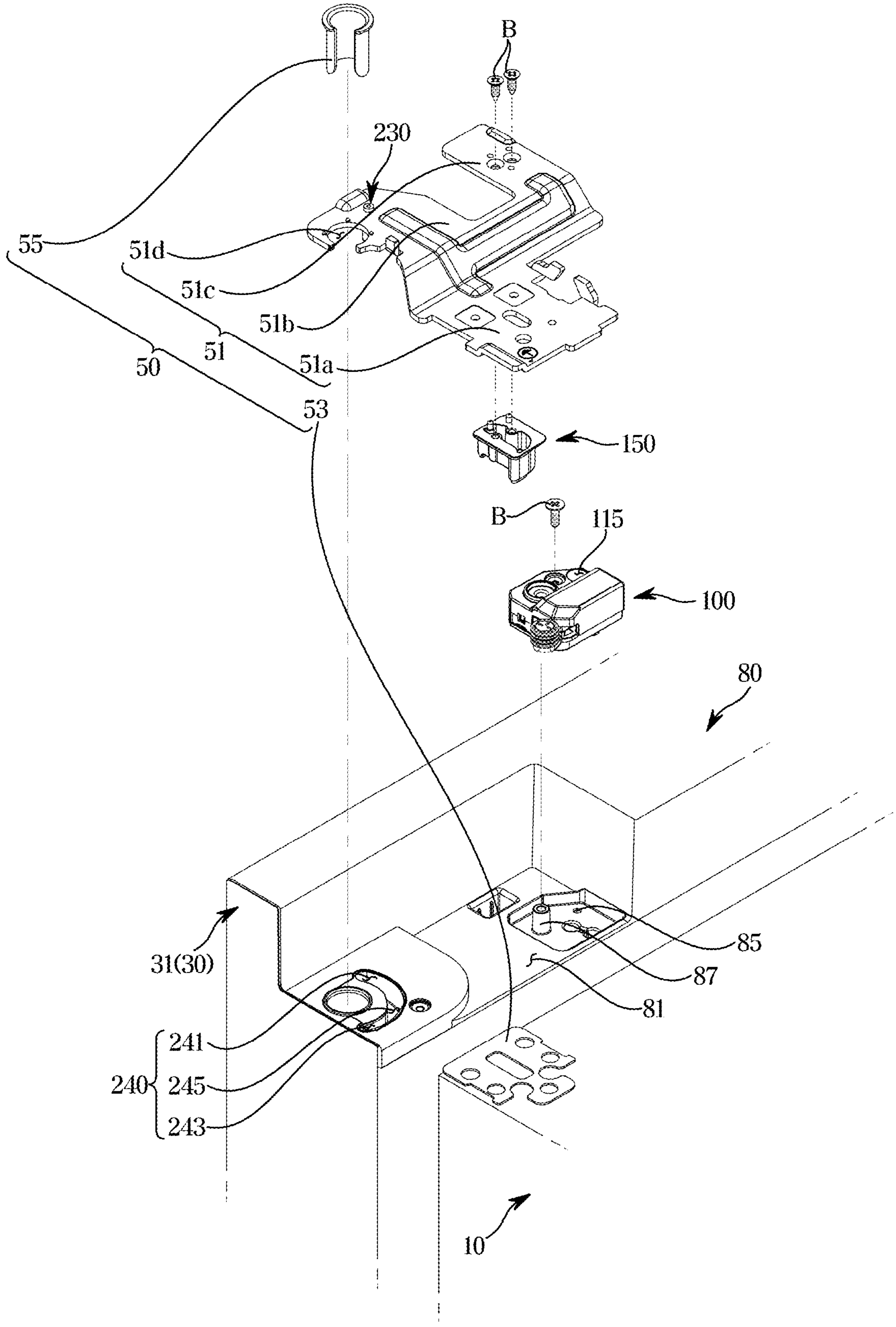
FIG. 4 is a view of the configuration shown in FIG. 3 from another direction.

FIG. 3 is a view showing the cam coupled to the upper hinge module and the elastic device coupled to a door cap, according to an embodiment. FIG. 4 is a view showing the configuration shown in FIG. 3 from a different orientation.

As shown in FIGS. 3 and 4, the upper hinge module 50 may include a bracket 51, a coupling member 53 secured to the upper portion of the cabinet 10 to couple the bracket 51 to the cabinet 10, and a hinge shaft 55 enabled to rotatably couple the door 30 to the bracket 51 such that the door 30 is rotatably coupled to the cabinet 10.

The bracket 51 may include a base 51*a* coupled to the cabinet 10, and an extension 51*b* extending from the base 51*a* to the door 30. The door 30 may be rotatably coupled to the extension 51*b*.

The extension 51*b* may be provided with a coupler 51*c* to which the cam 150 is coupled, and a through hole 51*d* through which the hinge shaft 55 is passed so that the extension 51*b* and the door 30 may be rotatably coupled. The hinge shaft 55 passing through the through hole 51*d* may be coupled by passing through a hinge hole 83 of a door cap 80 that is arranged on the upper portion of the door 30.

The coupling member 53 may be secured to the upper portion of the cabinet 10 and may be fixed to the base 51*a* of the bracket 51 to allow the bracket 51 to be coupled to the cabinet 10.

The hinge shaft 55 may be rotatably coupled to the upper portion of the door 30 so as to pass through the through hole 51*d* of the bracket 51 and the hinge hole 83 of the door cap 80, thereby allowing the door 30 to be rotatably coupled to the cabinet 10.

The door cap 80 may be arranged on the upper portion of the door 30. The door cap 80 may include a hinge receiving portion 81 in which the extension 51*b* of the bracket 51 is received.

The hinge receiving portion 81 may be provided with the hinge hole 83 through which the hinge shaft 55 is passed and coupled, and the hinge hole 83 may be formed at a position corresponding to the through hole 51*d* provided in the extension 51*b* of the bracket 51 received in the hinge receiving portion 81.

The elastic device 100 may be coupled to the hinge receiving portion 81 to contact the cam 150 coupled to the bracket 51 and transmit a force to the door 30 in an opening direction of the door 30 upon opening of the door 30.

In order to couple the elastic device 100, the hinge receiving portion 81 may be provided with an elastic device coupling hole 85. The elastic device 100 may be provided with a coupling hole 115 corresponding to the elastic device coupling hole 85, so that the elastic device coupling hole 85 and the coupling hole 115 may be aligned and then coupled with a fastener B.

In addition, the hinge receiving portion 81 may be provided with a guide protrusion 87 to guide a position of the elastic device 100. The guide protrusion 87 may secure the elastic device 100 so as to prevent movement of the elastic device 100 coupled to the hinge receiving portion 81.

Figure 5:
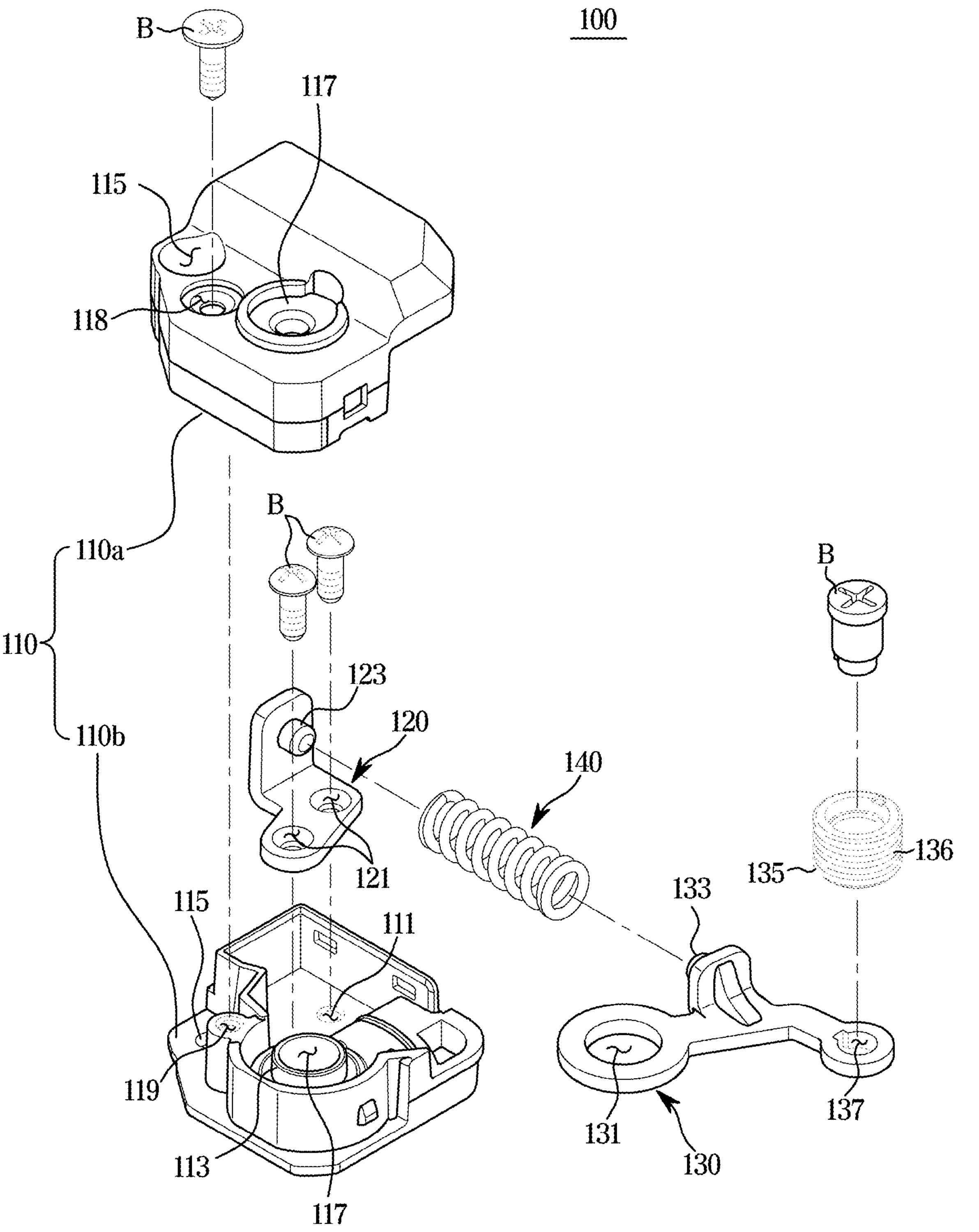
FIG. 5 is an exploded perspective view of the elastic device according to an embodiment of the disclosure.
Figure 6:
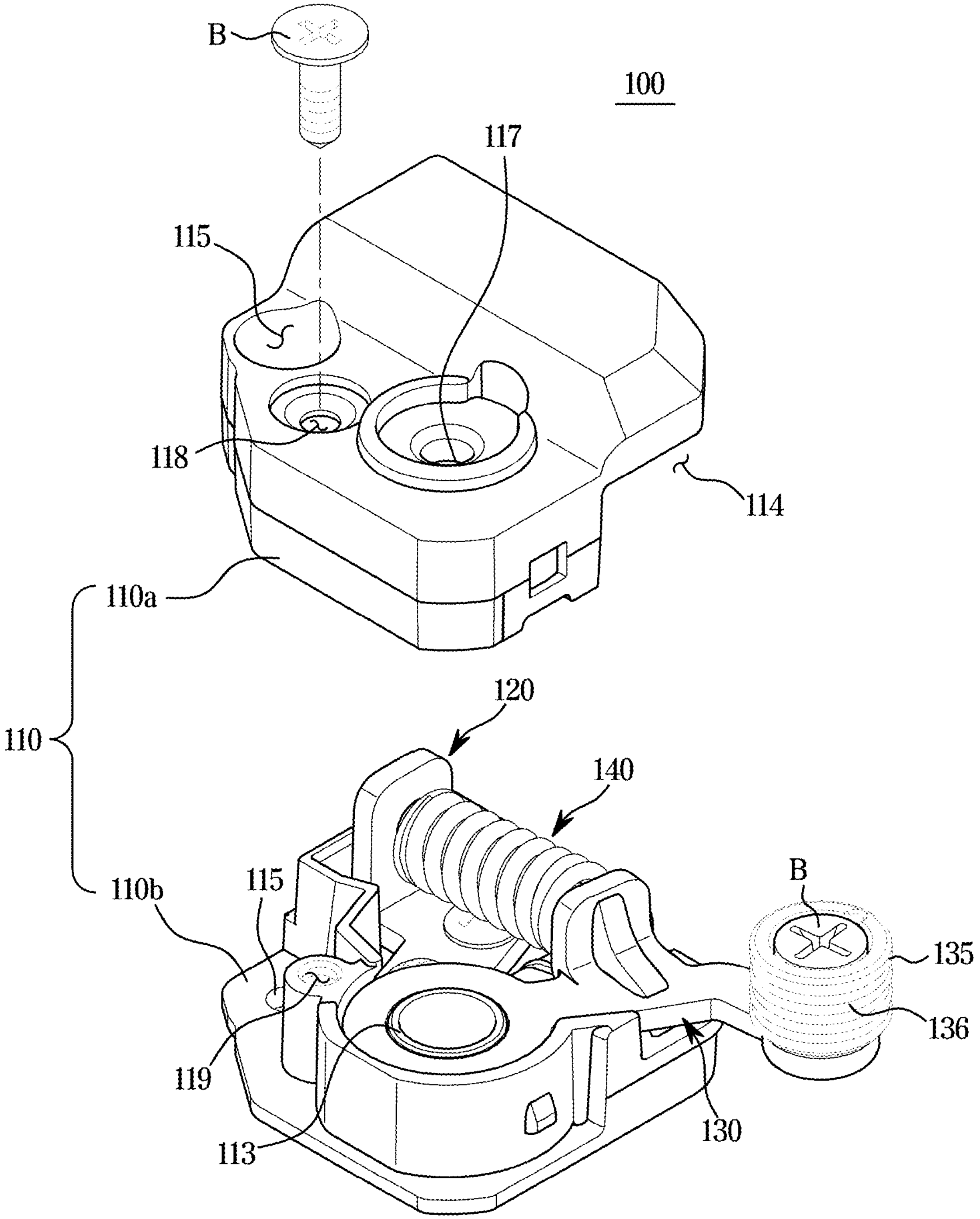
FIG. 6 is a view illustrating a first case separated from the elastic device according to an embodiment of the disclosure.
Figure 7:
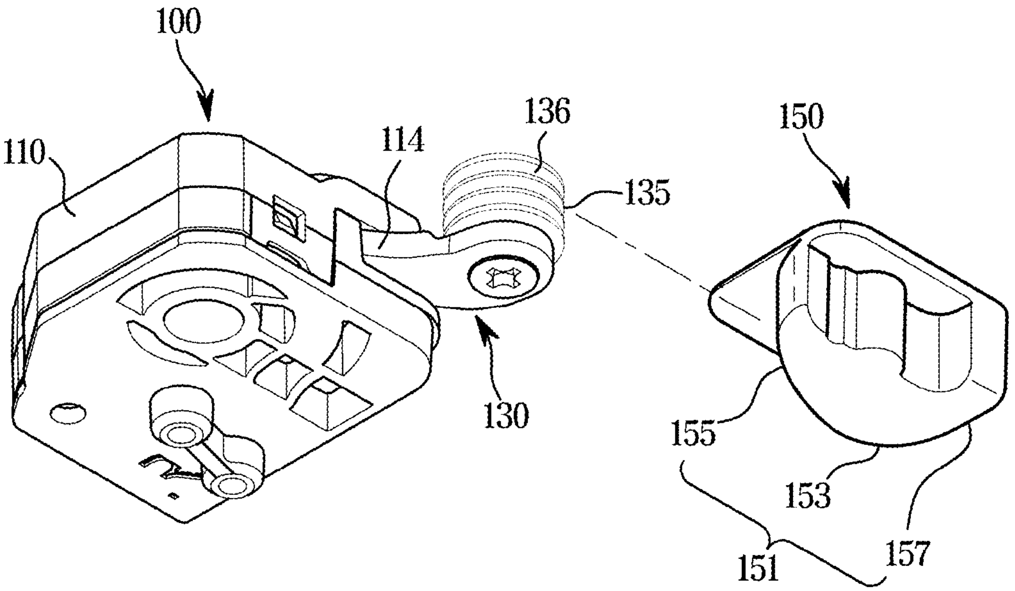
FIG. 7 is a view illustrating the elastic device and the cam, according to an embodiment of the disclosure.

FIG. 5 is an exploded perspective view of the elastic device according to an embodiment. FIG. 6 is a view showing a first case separated from the elastic device according to an embodiment. FIG. 7 is a view showing an elastic device and the cam according to an embodiment.

As shown in FIGS. 5 to 7, the elastic device 100 may be mounted to the door cap 80 arranged on the upper portion of the door 30. The elastic device 100 may transmit a force to the door 30 in the opening direction of the door 30 when the door 30 is opened. The elastic device 100 may accumulate an elastic force when the door 30 is opened by the pushers 91 (see FIG. 2) and then transmit the accumulated elastic force to the door 30 in the opening direction of the door 30 (see FIGS. 3 to 4).

The elastic device 100 may include a case 110. The case 110 may form an exterior of the elastic device 100. The case 110 may include a first case 110*a* and a second case 110*b*. The first case 110*a* may be fastened to an upper portion of the second case 110*b*. To join the first case 110*a* and the second case 110*b*, a fastening hole 118 and a fastening groove 119 may be formed in the first case 110*a* and the second case 110*b*, respectively. The fastener B through the fastening hole 118 may be fastened to the fastening groove 119, so that the first case 110*a* and the second case 110*b* may be fastened together.

The case 110 may include a support mounting groove 111 in which a support 120 is mounted by the fastener B. The support mounting groove 111 may be formed in a pair. The support mounting grooves 111 may be formed in the second case 110*b*. The support 120 may include a mounting hole 121 mounted in the support mounting groove 111 by the fastener B. The mounting hole 121 may be formed in a pair to correspond to the support mounting grooves 111.

The case 110 may include a rotation shaft 113 to which a lever 130 is rotatably coupled. The lever 130 may be rotatably coupled to the rotation shaft 113 and may rotate about the rotation shaft 113 when the door 30 (see FIG. 2) is opened or closed.

The case 110 may include an opening 114 open to allow the lever 130 to rotate about the rotation shaft 113. A portion of the lever 130 received in the case 110 may be exposed to an outside of the case 110 through the opening 114. The opening 114 may form a space for the lever 130 to rotate about the rotation shaft 113. The lever 130 exposed to the outside of the case 110 through the opening 114 may be rotated about the rotation shaft 113 by contacting a cam face 151 of the cam 150 when the door 30 (see FIG. 2) is opened or closed.

The case 110 may include the coupling hole 115 coupled to the elastic device coupling hole 85 of the door cap 80 by the fastener B. The coupling hole 115 may be formed in the first case 110*a* and the second case 110*b*.

The case 110 may include an insertion hole 117 into which the guide protrusion 87 of the door cap 80 is inserted. The guide protrusion 87 may be inserted into the insertion hole 117, such that the elastic device 100 may be secured to the upper portion of the door cap 80. The insertion hole 117 may be formed in the first case 110*a* and the second case 110*b*.

The elastic device 100 may include the support 120. The support 120 may be mounted within the case 110. The support 120 may include the mounting holes 121 mounted in the support mounting grooves 111 by the fasteners B. The support mounting grooves 111 and the mounting holes 121 may be provided as a pair.

The support 120 may include a first support projection 123 on which one end of a spring 140 is supported. The spring 140 may be supported at opposite ends by the support 120 and the lever 130 inside the case 110. One end of the spring 140 may be supported by the first support projection 123 of the support 120 fixed inside the case 110, and the other end may be supported by the lever 130 rotatably coupled to the rotation shaft 113 inside the case 110. In response to the opening of the door 30 (see FIG. 2), the lever 130 may rotate about the rotation shaft 113 by contacting the cam face 151, causing the spring 140 to be compressed or the compressed spring 140 to be restored to its length before being compressed. Although one end of the spring 140 is shown in the drawings as being supported by the first support projection 123 of the support 120, the present disclosure is not limited thereto. That is, one end of the spring 140 may be secured to any part other than the support 120 as long as it is secured when the lever 130 is rotated. For example, one end of the spring 140 may be attached to the inside of the case 110. The first support projection 123 may be integrally provided inside the case 110 so that one end of the spring 140 may be attached to the inside of the case 110. Based on one end of the spring 140 being secured to the first support projection 123 inside the case 110, the elastic device 100 may be configured without the support 120. In addition, although the drawings show the support 120 being provided separately and mounted inside the case 110, the present disclosure is not limited thereto. In other words, the support 120 may be formed integrally with the case 110.

The elastic device 100 may include the lever 130. The lever 130 may be rotatably coupled to the inside of the case 110. The lever 130 may include a rotation hole 131 rotatably coupled to the rotation shaft 113 of the case 110. In response to the opening of the door 30 (see FIG. 2), the lever 130 may rotate about the rotation shaft 113 while moving along the shape of the cam face 151 with the roller 135 in contact with the cam face 151 of the cam 150.

When the door 30 (see FIG. 2) is closed, the lever 130 may be in contact with the cam face 151. In this case, the cam face 151 may be a second contact surface 157. When the door 30 (see FIG. 2) is opened with the lever 130 being in contact with the second contact surface 157, the lever 130 may rotate about the rotation shaft 113 while moving along the second contact surface 157. As the lever 130 is rotated about the rotation shaft 113, the spring 140 may be compressed by the rotation of the lever 130. When the spring 140 is compressed, the spring 140 may accumulate an elastic force. The spring 140 may be compressed until the lever 130 is moved along the second contact surface 157 and positioned at the inflection point 153. To ensure that the spring 140 is compressed, when the door 30 (see FIG. 2) is initiated to be opened by the pushers 91 (see FIG. 2) and then the door 30 (see FIG. 2) is opened to a first angle A1, that is, when the lever 130 moves along a first contact surface 155 after being positioned at the inflection point 153 of the cam face 151, the direction of rotation of the lever 130 is reversed, such that the compressed spring 140 may be restored to its length before being compressed. In this case, the first angle A1 may be about 8 degrees. When the spring 140 is restored, the elastic force accumulated in the spring 140 may be transmitted to the door 30 (see FIG. 2). As described above, in response to the rotation of the lever 130 about the rotation shaft 113, the spring 140 may be compressed or restored to its length before being compressed depending on the direction of rotation of the lever 130.

The lever 130 may include a second support projection 133 on which the other end of the spring 140 is supported. The spring 140 may be supported at one end on the first support projection 123 of the support 120 secured inside the case 110, and may be supported at the other end on the second support projection 133 of the lever 130 rotatably coupled to the rotation shaft 113 inside the case 110. Accordingly, since the spring 140 is secured to the support 120 at one end when the lever 130 is rotated in response to the opening of the door 30 (see FIG. 2), the other end may be compressed or restored to its pre-compressed length by the rotation of the lever 130.

The lever 130 may include the roller 135 that contacts the cam face 151 of the cam 150 when the door 30 (see FIG. 2) is opened. The roller 135 in contact with the cam face 151 may move along the shape of the cam face 151 to cause the lever 130 to rotate about the rotation shaft 113. When the lever 130 rotates about the rotation shaft 113, the roller 135 may be moved while maintaining a state of being in contact with the cam face 151 by the elastic force of the spring 140. Because the roller 135 moves while maintaining a state of being in contact with the cam face 151 as the lever 130 rotates about the rotation shaft 113, the spring 140 may be compressed more efficiently to accumulate the elastic force, and when the compressed spring 140 is restored to its length before being compressed, the elastic force of the spring 140 may be transmitted more efficiently to the door 30 (see FIG. 2).

The roller 135 may include a plurality of grooves 136 formed along an outer circumferential surface of the roller 135. By forming the plurality of grooves 136 on the outer circumferential surface of the roller 135, the contact area between the roller 135 and the cam face 151 may be reduced when the roller 135 is in contact with the cam face 151. As a result, the frictional force between the roller 135 and the cam face 151 may be reduced.

The lever 130 may include a roller mounting hole 137 in which the roller 135 is mounted. The roller 135 may be rotatably mounted in the roller mounting hole 137 by the fastener B.

The elastic device 100 may include the spring 140. The spring 140 may be a compression spring. The spring 140 may have one end supported by the first support projection 123 of the support 120 secured inside the case 110, and the other end supported by the second support projection 133 of the lever 130 rotatably coupled to the rotation shaft 113 inside the case 110. Accordingly, the spring 140 may be compressed or restored to its pre-compressed length, depending on the direction of rotation of the lever 130 in response to the rotation of the lever 130 about the rotation shaft 113. The spring 140 may accumulate an elastic force as much as the spring 140 is compressed when the spring 140 is compressed by the lever 130, and may transmit the accumulated elastic force to the door 30 (see FIG. 2) when the compressed spring 140 is restored to its pre-compressed length.

The spring 140, a compression spring, may have a smaller size but greater elastic force rather than the elastic device 100 in contact with the cam 150, which is formed as a single lever to utilize the elastic force of the material, and thus the elastic device 100 using the elastic force of the spring 140 may transmit greater force to the door 30.

While the drawings show a configuration in which the elastic device 100 includes the spring 140 and transmits a force to the door 30 (see FIG. 2) using the elastic force of the spring 140, it is not limited thereto. In other words, the elastic device 100 may be formed entirely of an elastic material. For example, the configuration of the elastic device 100, except for the roller 135 that contacts the cam face 151, may be formed entirely of an elastic material such as rubber.

The cam 150 may be coupled to the upper portion of the cabinet 10 (see FIG. 2). The cam 150 may be coupled to the upper hinge module 50 coupled to the upper portion of the cabinet 10 (see FIG. 2). The cam 150 may be coupled to the coupler 51*c* of the upper hinge module 50. The cam 150 may include the cam face 151 that allows the roller 135 of the elastic device 100 to move in contact when the door 30 (see FIG. 2) is opened.

The cam face 151 may include the inflection point 153 that serves as a reference point for the spring 140 of the elastic device 100 to accumulate an elastic force and then transfer the accumulated elastic force to the door 30 (see FIG. 2) when the door 30 (see FIG. 2) is opened by the pushers 91 (see FIG. 2). The inflection point 153 may be a maximally protruding portion of the protruding cam face 151. In response to the opening of the door 30 (see FIG. 2), the roller 135 of the elastic device 100 may pass the inflection point 153, and the elastic device 100 may transmit an opening force to the door 30 (see FIG. 2) by the elastic force of the spring 140.

The cam face 151 may include the second contact surface 157 that is contacted before the lever 130 contacts the inflection point 153 when the door 30 is opened by the pushers 91. In other words, when the door 30 is opened, the roller 135 of the lever 130 may contact the second contact surface 157 before contacting the inflection point 153. When the door 30 is opened, the second contact surface 157 may be a section where the elastic device 100 accumulates an elastic force (See FIG. 2).

The cam face 151 may include the first contact surface 155 that is contacted after the lever 130 contacts the inflection point 153 when the door 30 is opened by the pushers 91. In other words, when the door 30 is opened, the roller 135 of the lever 130 may contact the first contact surface 155 after the roller 135 of the lever 130 contacts the inflection point 153. When the door 30 is opened, the first contact surface 155 may be a section in which the elastic device 100 transmits an elastic force to the door 30 (see FIG. 2).

The first contact surface 155 and the second contact surface 157 of the cam face 151 may be formed to be inclined in a direction opposite to the direction in which the cam face 151 protrudes with respect to the inflection point 153. Accordingly, the inflection point 153 may be a maximally protruding portion of the cam face 151 protruding in a triangular shape.

A cam device 200 may be provided at the lower portion of the door 30 to impart an additional opening force to the door 30 being opened by the elastic device 100. The cam device 200 will be described in more detail below (see FIG. 8).

The upper hinge module 50 may include a guide shaft 230 protruding toward the door 30 at a portion adjacent to the hinge shaft 55. The guide shaft 230 may be formed to protrude downwardly from a lower surface of the extension 51*b* of the upper hinge module 50. The guide shaft 230 may be inserted into a guide hole 240 formed in the door cap 80. When the door 30 is opened or closed in a state in which the guide shaft 230 is inserted into the guide hole 240, the guide shaft 230 may be guided along the guide hole 240.

The door cap 80 may include the guide hole 240 formed along a circumference of the hinge hole 83. The guide hole 240 may be formed in an arc shape along the circumference of the hinge hole 83. In response to the guide shaft 230 being inserted into the guide hole 240 and the door 30 being opened or closed, the guide hole 240 may guide the guide shaft 230.

The guide hole 240 may be formed such that its width gradually decreases in a direction from the front of the door 30 toward the rear of the door 30. In other words, the guide hole 240 may be formed such that its width gradually decreases along the direction in which the guide shaft 230 is moved when the door 30 is opened.

The guide hole 240 may include a first portion 241 adjacent to the front surface of the door 30. The first portion 241 may be a portion having the largest width of the width of the guide hole 240. The first portion 241 may be a portion where the guide shaft 230 is positioned when the door 30 is closed (see FIG. 12).

The guide hole 240 may include a second portion 243 adjacent to the rear surface of the door 30. The second portion 243 may be a portion having the smallest width of the width of the guide hole 240. The second portion 243 may be a portion where the guide shaft 230 is positioned when the door 30 is fully open (see FIG. 20).

The guide hole 240 may include a third portion 245 formed between the first portion 241 and the second portion 243. The third portion 245 may be a portion having a width approximately equal to the thickness of the guide shaft 230. The third portion 245 may be a portion where the guide shaft 230 is positioned when the door 30 is opened 90 degrees (see FIG. 18).

Figure 8:
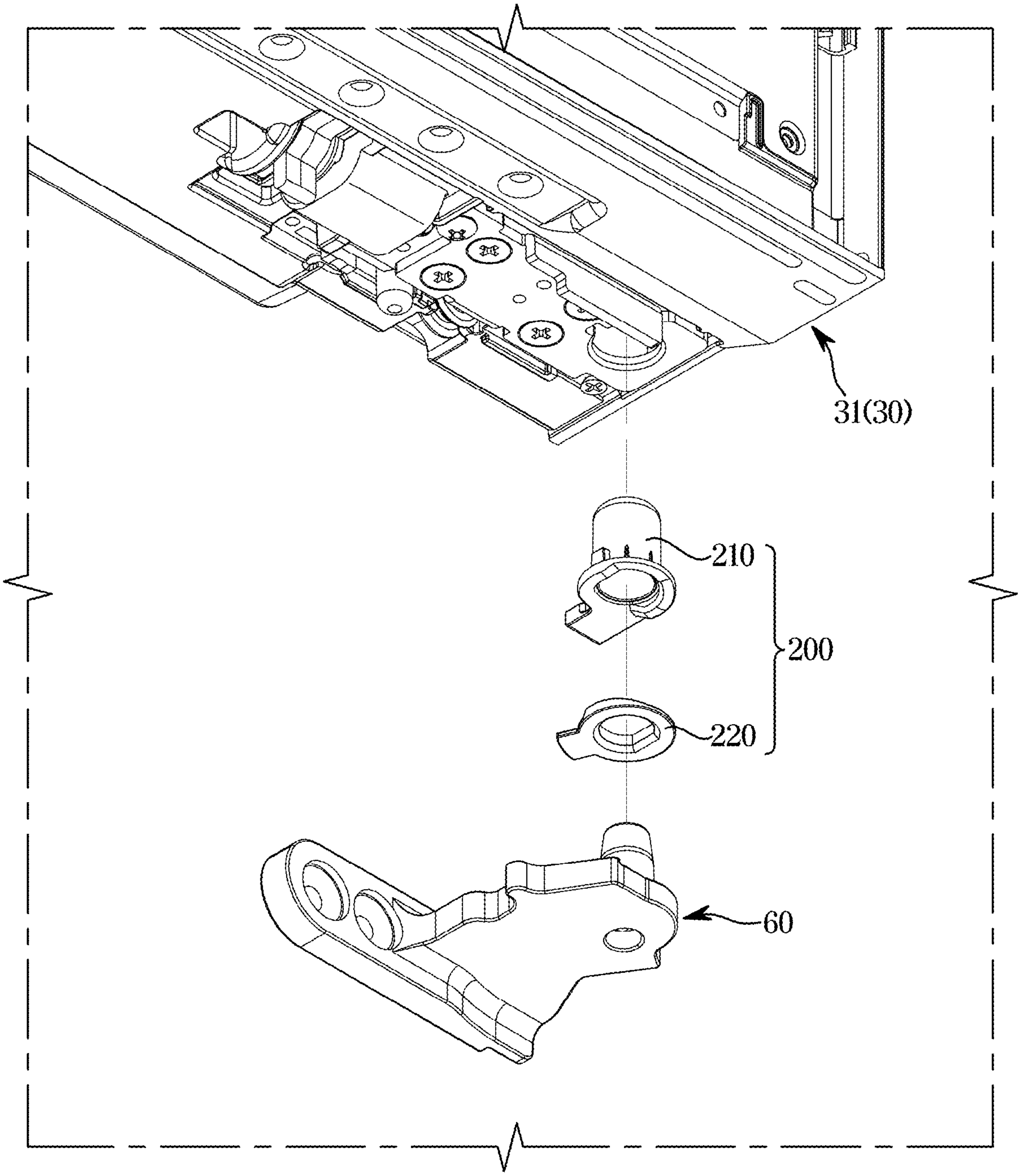
FIG. 8 is a view illustrating a cam device according to an embodiment of the disclosure, wherein an upper cam is coupled to a lower end of the door and a lower cam is coupled to a lower hinge module of the door.
Figure 9:
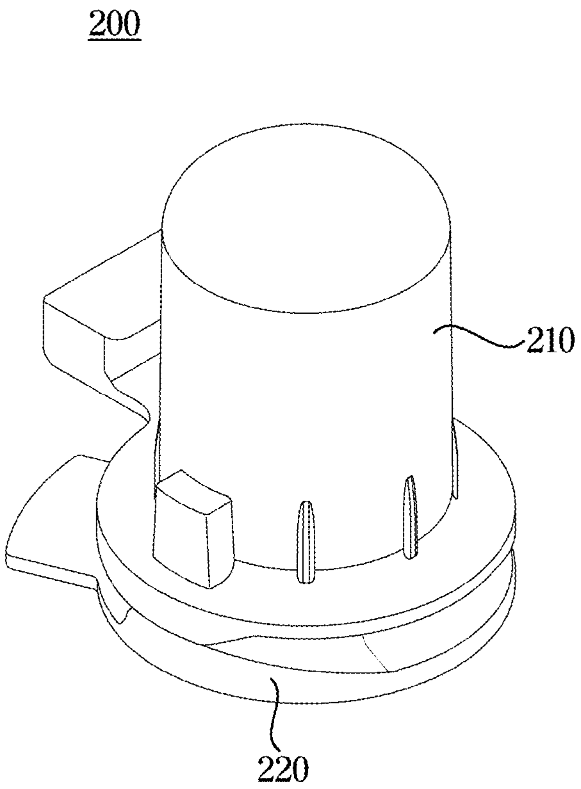
FIG. 9 is a view illustrating the cam device according to an embodiment of the disclosure.
Figure 10:
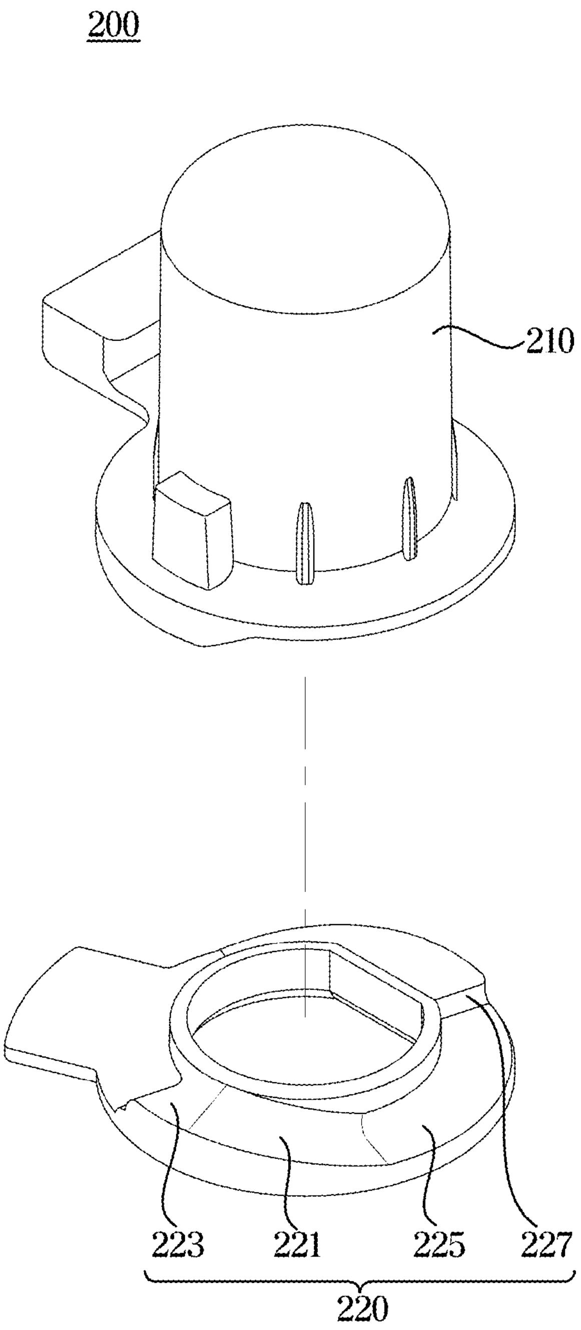
FIG. 10 is an exploded view of the cam device shown in FIG. 9.
Figure 11:
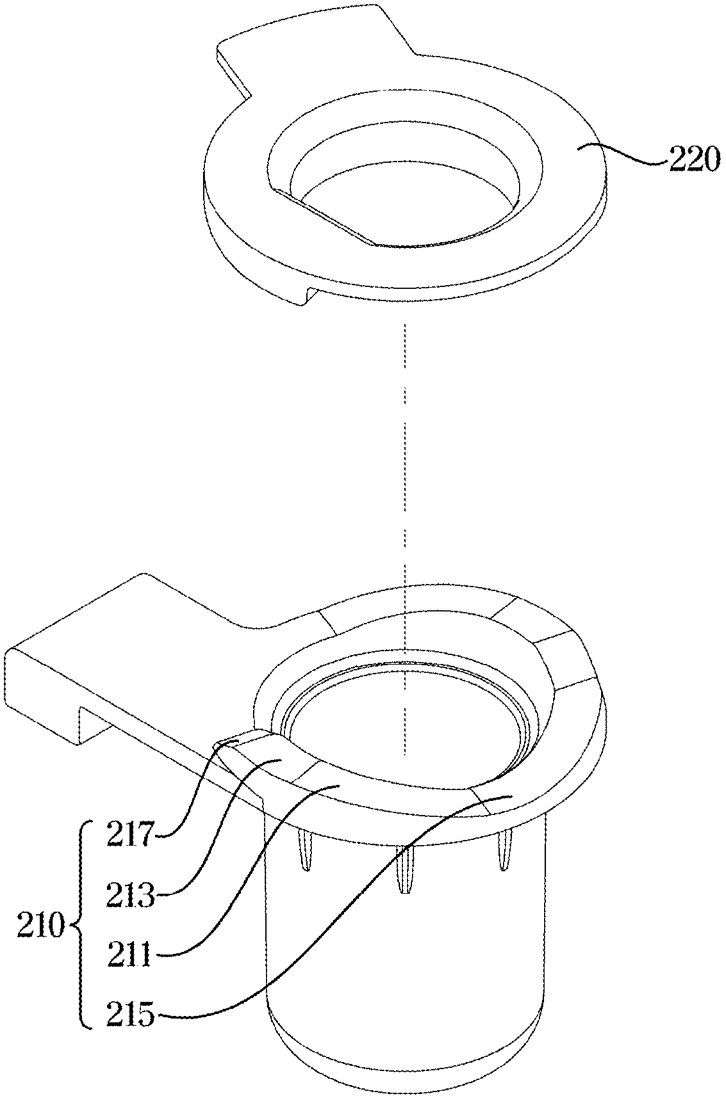
FIG. 11 is a view of the disassembled cam device shown in FIG. 10 from another direction.

FIG. 8 is a view showing the cam device according to an embodiment, wherein an upper cam is coupled to the lower portion of the door and a lower cam is coupled to the lower hinge module of the door. FIG. 9 is a view showing the cam device according to an embodiment. FIG. 10 is an exploded view of the cam device shown in FIG. 9. FIG. 11 is a view of the disassembled cam device shown in FIG. 10 from a different orientation.

As shown in FIGS. 8 to 11, the cam device 200 may be provided at the lower portion of the door. The cam device 200 may impart an additional opening force to the door 30 being opened by the elastic device 100 (see FIG. 2).

The cam device 200 may include an upper cam 210 coupled to the lower end of the door 30. The upper cam 210 may be coupled to the lower end of the door 30 and may rotate together with the door 30. The upper cam 210 may include a first inclined surface 211.

The upper cam 210 may include planar portions 213 and 215 formed on either side of the first inclined surface 211. The planar portions 213 and 215 may include a first planar portion 213 formed on one side of the first inclined surface 211. The first planar portion 213 may be a plane in contact with a third planar portion 223 of a lower cam 220 when the door 30 is closed. The planar portions 213 and 215 may include a second planar portion 215 formed on the other side of the first inclined surface 211. The second planar portion 215 may be a plane in contact with the third planar portion 223 of the lower cam 220 when the door 30 is opened 90 degrees.

The upper cam 210 may include a locking portion 217 formed on the opposite side of the first inclined surface 211 from the first planar portion 213. In other words, the first inclined surface 211 and the locking portion 217 may be formed on both sides of the first planar portion 213. The locking portion 217 may be a portion that contacts a stopper 227 of the lower cam 220 when the door 30 is fully open. In other words, in response to the upper cam 210 rotating and the locking portion 217 of the upper cam 210 being caught by the stopper 227 of the lower cam 220, the door 30 may be stopped in a fully open state.

The cam device 200 may include the lower cam 220 coupled to the lower hinge module 60 disposed on the lower side of the door 30. The lower cam 220 may be disposed on the lower side of the upper cam 210 and may be secured to the lower hinge module 60 based on the upper cam 210 being rotated.

The lower cam 220 may include a second inclined surface 221. The second inclined surface 221 may be a surface on which the first inclined surface 211 slidably moves so that when the door 30 is opened by the elastic device 100 (see FIG. 2), the door 10 is rotated in the opening direction.

The lower cam 220 may include planar portions 223 and 225 formed on both sides of the second inclined surface 221. The planar portions 223 and 225 may include the third planar portion 223 formed on one side of the second inclined surface 221. The third planar portion 223 may be a plane that contacts the first planar portion 213 of the upper cam 210 when the door 30 is closed. The planar portions 223 and 225 may include the fourth planar portion 225 formed on the other side of the second inclined surface 221. The fourth planar portion 225 may be a plane that contacts the first planar portion 213 of the upper cam 210 when the door 30 is opened 90 degrees.

The lower cam 220 may include the stopper 227 formed on the opposite side of the second inclined surface 221 from the fourth planar portion 225. In other words, the second inclined surface 221 and the stopper 227 may be formed on both sides of the fourth planar portion 225. The stopper 227 may be a portion that contacts the locking portion 217 of the upper cam 210 when the door 30 is fully open. In other words, in response to the upper cam 210 rotating and the locking portion 217 of the upper cam 210 being caught by the stopper 227 of the lower cam 220, the door 30 may be stopped in the fully open state.

Figure 12:
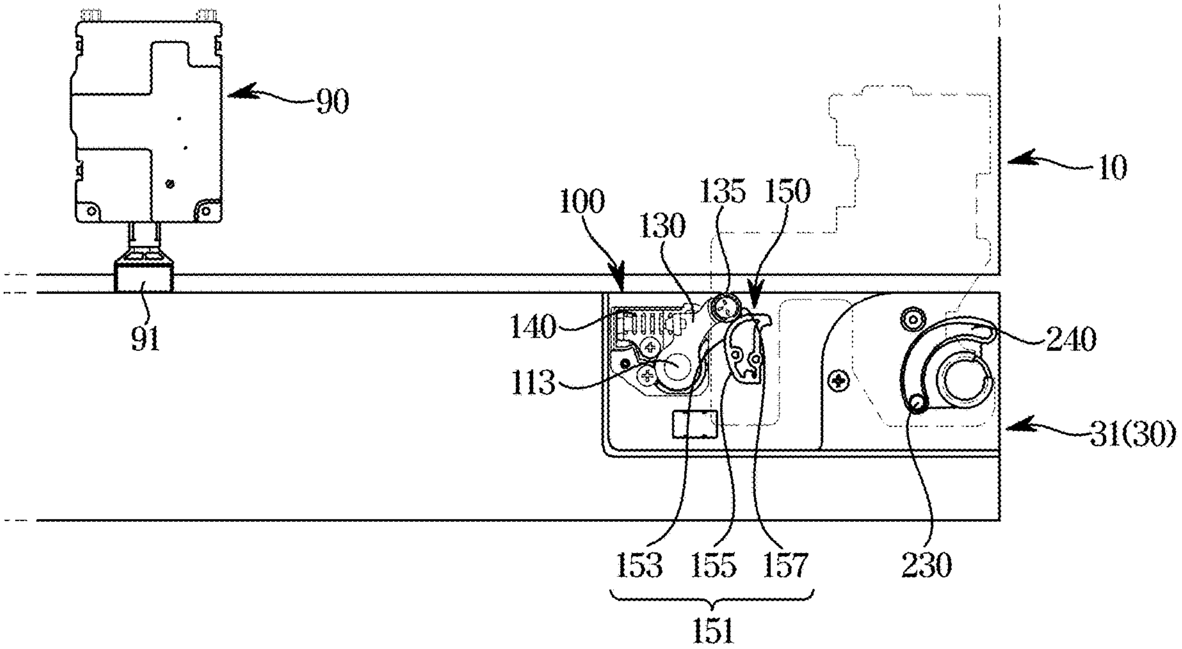
FIG. 12 is a view illustrating a state in which the door is closed, according to an embodiment of the disclosure.
Figure 13:
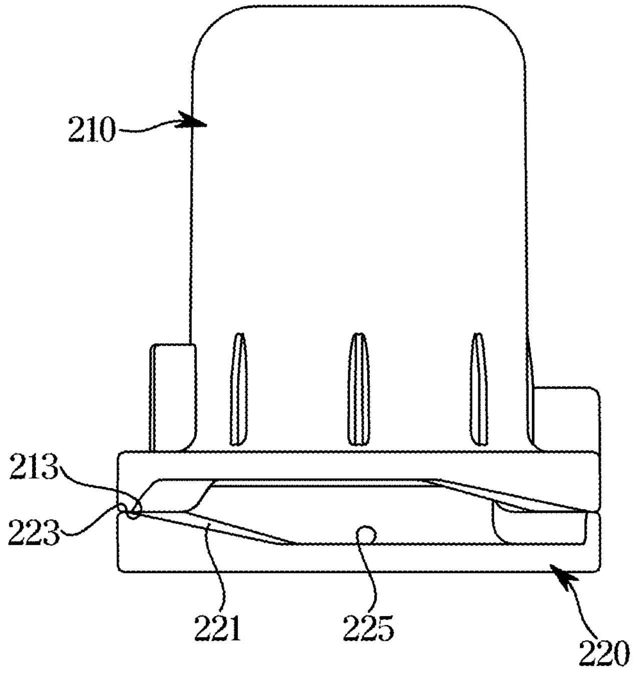
FIG. 13 is a view illustrating the cam device when the door is closed, according to an embodiment of the disclosure.
Figure 14:
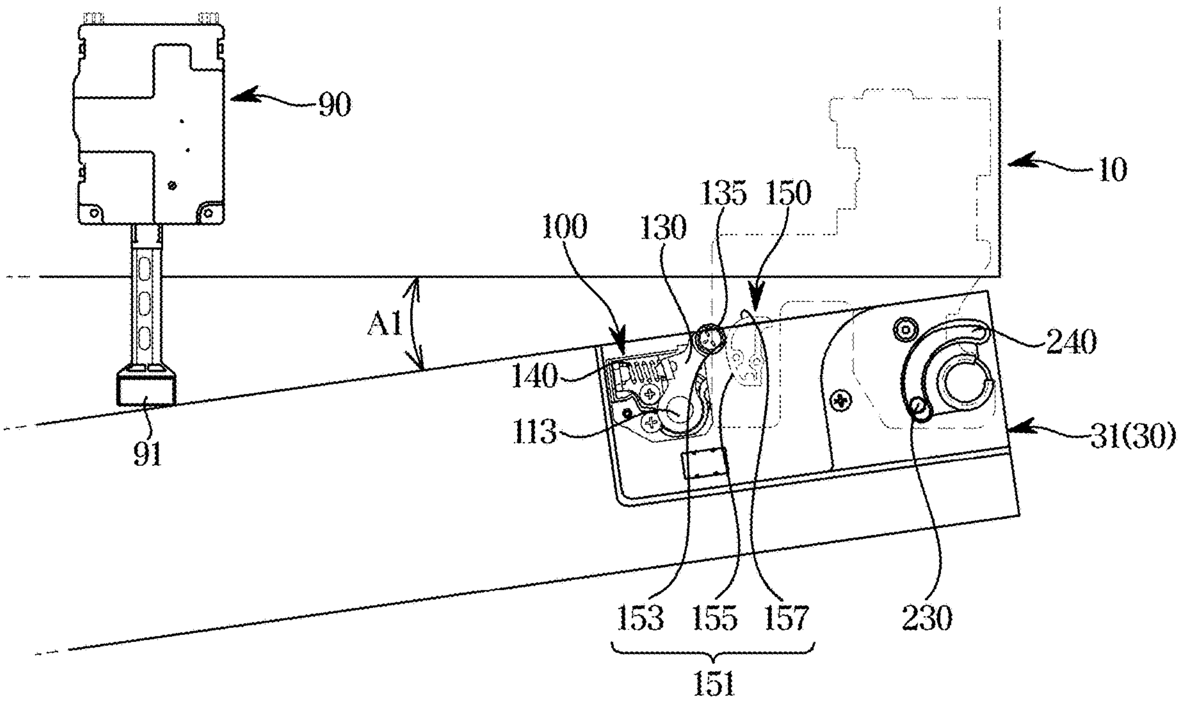
FIG. 14 is a view illustrating a state in which the door is opened by a first angle by the pusher, according to an embodiment of the disclosure.
Figure 15:
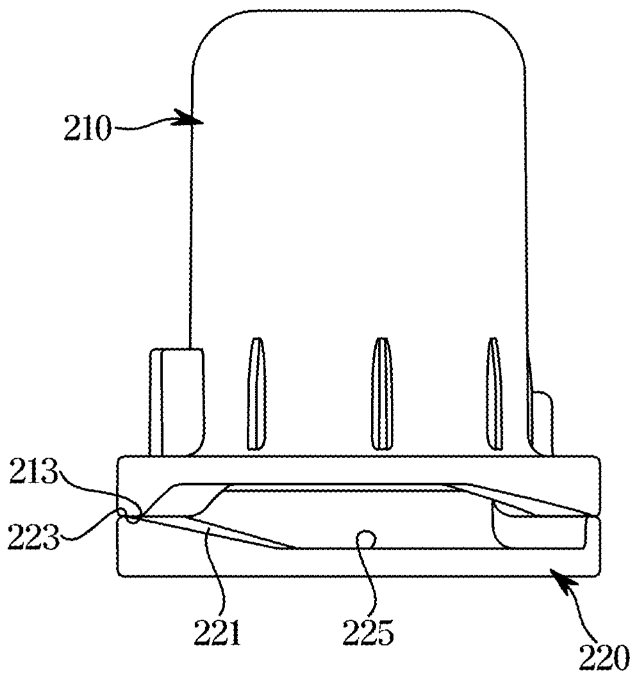
FIG. 15 is a view illustrating the cam device when the door is opened by the first angle by the pusher, according to an embodiment of the disclosure.
Figure 16:
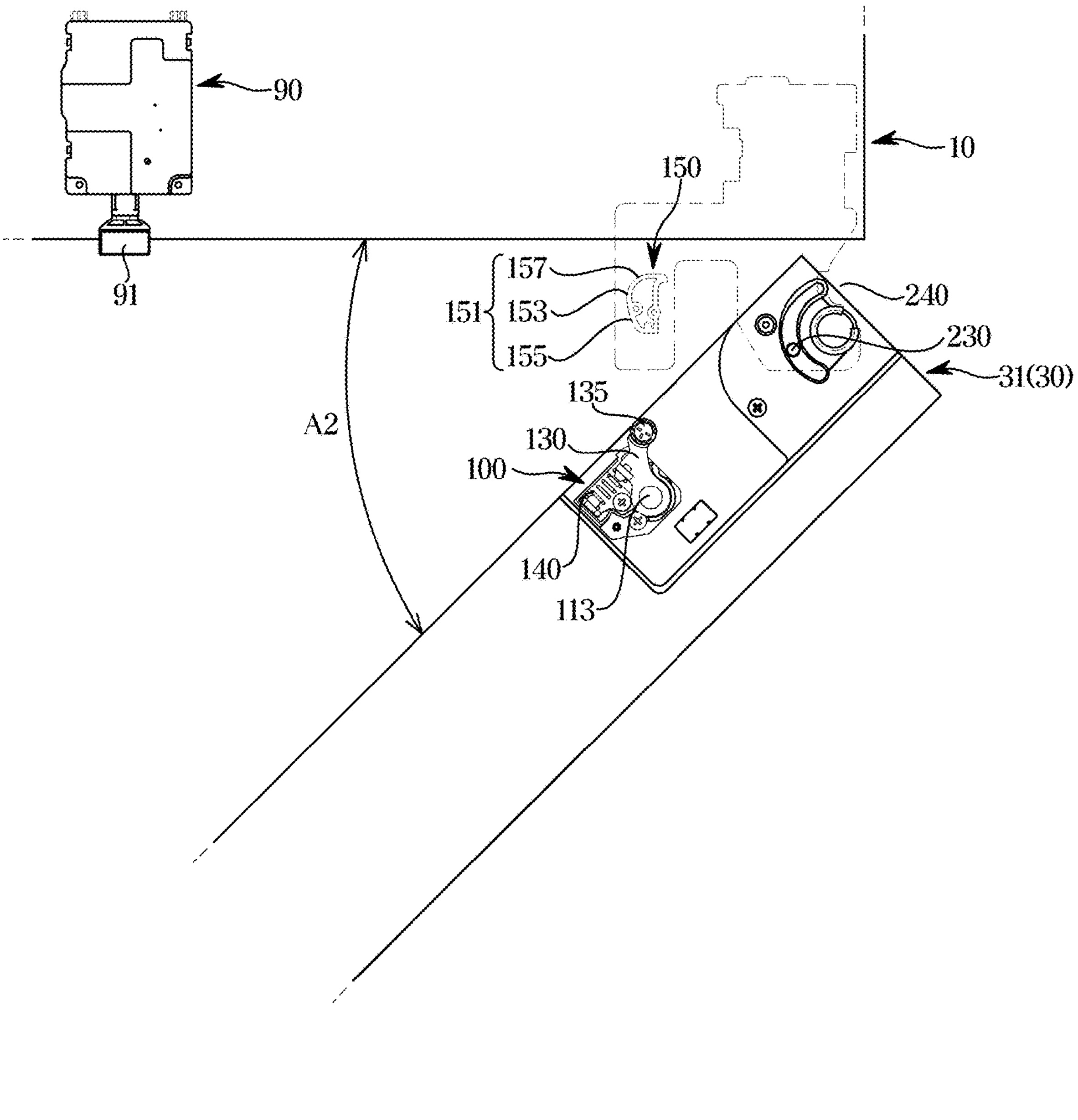
FIG. 16 is a view illustrating a state in which the door is opened by a second angle by the elastic device, according to an embodiment of the disclosure.
Figure 17:
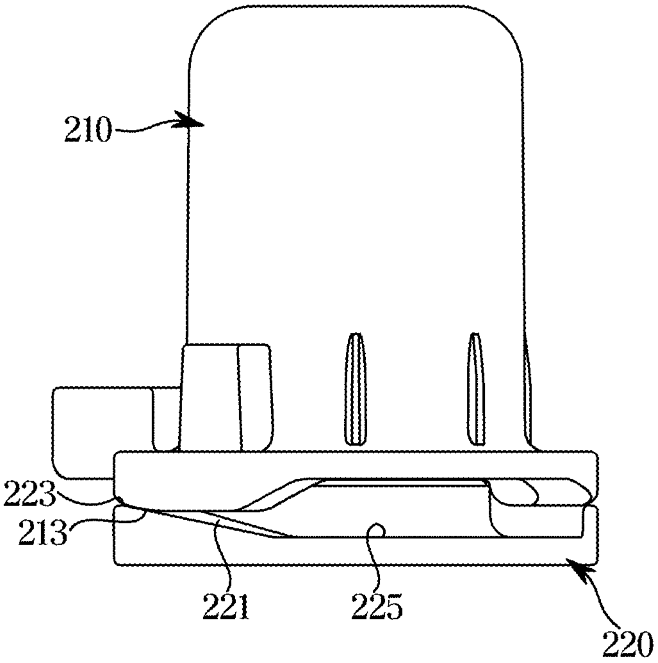
FIG. 17 is a view illustrating the cam device when the door is opened by the second angle by the elastic device, according to an embodiment of the disclosure.
Figure 18:
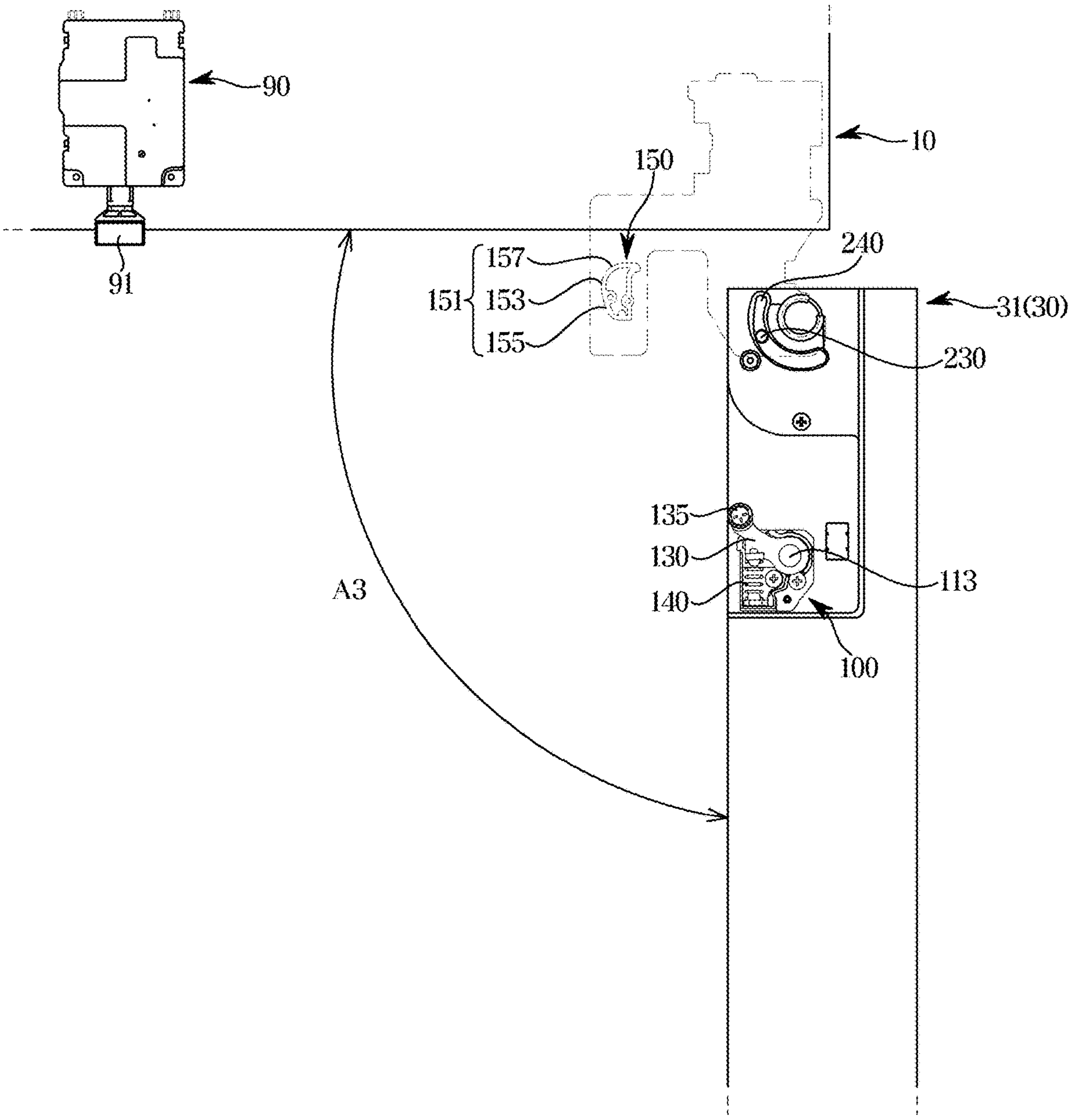
FIG. 18 is a view illustrating a state in which the door is opened by a third angle, according to an embodiment of the disclosure.
Figure 19:
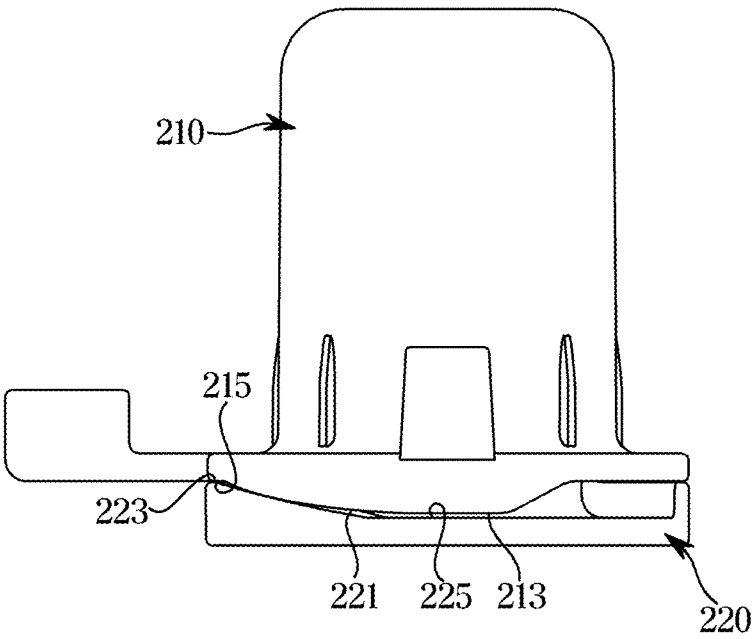
FIG. 19 is a view illustrating the cam device when the door is opened by the third angle, according to an embodiment of the disclosure.
Figure 20:
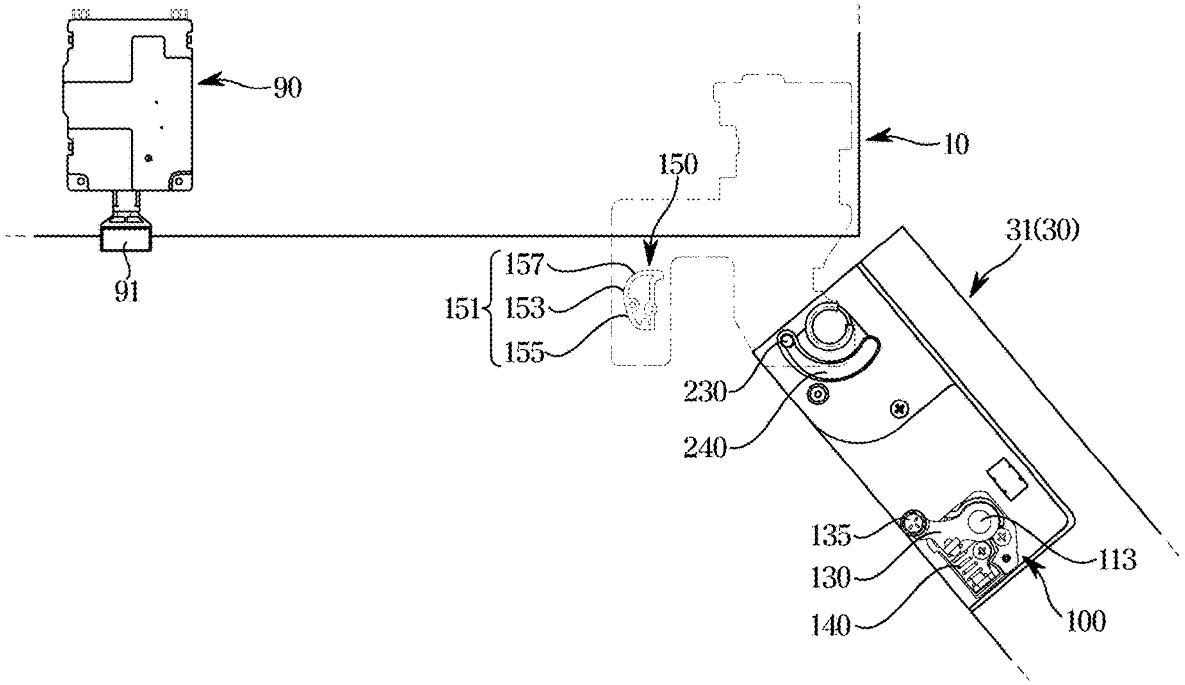
FIG. 20 is a view illustrating a state in which the door is fully open, according to an embodiment of the disclosure.
Figure 21:
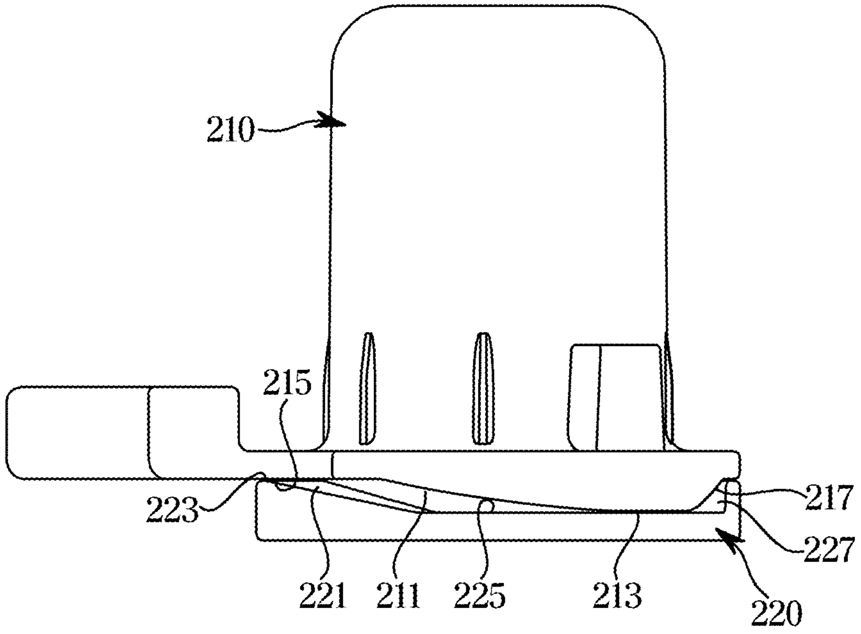
FIG. 21 is a view illustrating the cam device when the door is fully open, according to an embodiment of the disclosure.

FIG. 12 is a view showing a state in which the door is closed, according to an embodiment. FIG. 13 is a view showing the cam device when the door is closed according to an embodiment. FIG. 14 is a view showing a state in which the door is opened by a first angle by the pusher, according to an embodiment. FIG. 15 is a view showing the cam device when the door is opened by the first angle by the pusher, according to an embodiment. FIG. 16 is a view showing a state in which the door is opened by a second angle by the elastic device, according to an embodiment. FIG. 17 is a view showing the cam device when the door is opened by the second angle by the elastic device, according to an embodiment. FIG. 18 is a view showing a state in which the door is opened by a third angle, according to an embodiment. FIG. 19 is a view showing the cam device when the door is opened by the third angle, according to an embodiment. FIG. 20 is a view showing a state in which the door is fully open, according to an embodiment. FIG. 21 is a view showing the cam device when the door is fully open, according to an embodiment.

As shown in FIGS. 12 and 13, based on the door 30 being closed, the roller 135 of the elastic device 100 may be in contact with the cam face 151 of the cam 150. More particularly, based on the door 30 being closed, the roller 135 of the elastic device 100 may be in contact with the second contact surface 157 of the cam face 151 of the cam 150.

Based on the door 30 being closed, the cam device 200 may have the first planar portion 213 of the upper cam 210 in contact with the third planar portion 223 of the lower cam 220. In other words, the first planar portion 213 of the upper cam 210 may be positioned above the third planar portion 223 while in contact with the third planar portion 223 of the lower cam 220.

Based on the door 30 being closed, the guide shaft 230 may be positioned at the first portion 241 of the guide hole 240 (see FIG. 4).

As shown in FIGS. 14 and 15, in response to a user touching the touch sensor 36 (see FIG. 1), the pusher 91 may move forward in the direction that is from the cabinet 10 toward the door 30 to push the door 30. Based on the door 30 being opened by the pusher 91 to a first angle A1, the roller 135 of the elastic device 100 may move to be positioned at the inflection point 153 along the shape of the second contact surface 157. In this case, the first angle A1 may be about 8 degrees. In response to the roller 135 of the elastic device 100 moving toward the inflection point 153 along the shape of the second contact surface 157, the lever 130 of the elastic device 100 may be rotated counterclockwise about the rotation shaft 113 in the drawing. The spring 140 may be compressed by the rotation of the lever 130. In response to the roller 135 of the elastic device 100 passing the second contact surface 157 and being positioned at the inflection point 153, the spring 140 may be maximally compressed.

Based on the door 30 being opened by the pusher 91 by the first angle A1, the upper cam 210 may be rotated by the first angle A1 in the opening direction of the door 30 while maintaining a state in which the first planar portion 213 is in contact with the third planar portion 223 of the lower cam 220.

Based on the door 30 being opened by the pusher 91 by the first angle A1, the guide shaft 230 may move from the first portion 241 of the guide hole 240 toward the second portion 243.

As shown in FIGS. 16 and 17, in response to the roller 135 of the elastic device 100 passing the inflection point 153, the compressed spring 140 may be restored to its pre-compressed length and the lever 130 may be rotated clockwise about the rotation shaft 113 in the drawing. In this case, the roller 135 may be moved beyond the inflection point 153 along the shape of the first contact surface 155. In response to the lever 130 being rotated by the elastic force of the spring 140 and the roller 135 being moved beyond the inflection point 153 along the shape of the first contact surface 155, the elastic force of the spring 140 may be transmitted to the door 30. The elastic force transmitted by the spring 140 to the door 30 may cause the door 30 to be opened to a second angle A2, which is greater than the first angle A1 (see FIG. 14). In this case, the second angle A2 may be about 45 degrees. Based on the door 30 being opened by the second angle A2, the roller 135 of the elastic device 100 may be spaced apart from the first contact surface 155.

In response to the door 30 being opened by the elastic device 100 by an angle greater than the first angle A1 (see FIG. 12) and less than the second angle A2, the upper cam 210 may be rotated such that the first planar portion 213 slidably moves along the second inclined surface 221 of the lower cam 220. The upper cam 210 may be rotated such that the first inclined surface 211, followed by the second planar portion 215, slidably moves along the second inclined surface 221 of the lower cam 220, thereby allowing the door 30 to open to a third angle A3. In this case, the third angle A3 may be about 90 degrees (see FIGS. 18 and 19).

Based on the door 30 being opened by the cam device 200, the guide shaft 230 may move from the first portion 241 of the guide hole 240 toward the second portion 243.

As shown in FIGS. 18 and 19, in response to the door 30 being opened by the cam device 200 by an angle greater than the second angle A2, the upper cam 210 may rotate while the first inclined surface 211 slidably moves along the second inclined surface 221 of the lower cam 220. After the first inclined surface 211 slidably moves along the second inclined surface 221, the upper cam 210 may stop rotating when the first planar portion 213 contacts the fourth planar portion 225 of the lower cam 220. Based on the rotation of the upper cam 210 being stopped, the door 30 may be rotated by the third angle A3. In other words, the door 30 may be stopped in a state in which the door 30 is opened by the cam device 200 by the third angle A3.

Based on the door 30 being opened by the third angle A3 by the cam device 200, the guide shaft 230 may be positioned at the third portion 245 of the guide hole 240. Based on the guide shaft 230 being positioned at the third portion 245 of the guide hole 240 having a width equal to the thickness of the guide shaft 230, its movement may be restricted. In other words, an impact on the door 30 may occur when the door 30 stops while being opened by the third angle A3 by the cam device 200, but the impact on the door 30 may be reduced by the guide shaft 230 whose movement is restricted while the door 30 is opened by the third angle A3.

As shown in FIGS. 20 and 21, in response to a force being transmitted to the door 30 in the opening direction of the door 30 while the door 30 is opened by the third angle A3 (see FIG. 18), the upper cam 210 may be rotated such that the first planar portion 213 moves along the fourth planar portion 225 of the lower cam 220. The rotating upper cam 210 may cause the door to stop in the fully open state in response to the locking portion 217 being caught by the stopper 227 of the lower cam 220.

Based on the door 30 being in the fully open state, the guide shaft 230 may be positioned at the second portion 243 of the guide hole 240. Based on the guide shaft 230 being positioned at the second portion 243 of the guide hole 240, its movement may be restricted. In other words, an impact on the door 30 may occur when the door 30 is maximally opened by an external force and is stopped in the fully open state by the cam device 200, but the impact on the door 30 may be reduced by the guide shaft 230 whose movement is restricted while the door 30 is in the fully open state.

According to an embodiment of the present disclosure, the refrigerator may include the cabinet 10 including the storage compartment 20, the door 30 rotatably coupled to the cabinet and configured to open or close the storage compartment, the pusher 91 configured to push the door such the door is opened, an elastic device 100 configured to be compressed in response to the door being opened by the pusher and transmit the compressed elastic force to the door such that the door is opened further, and the cam device 200 at a lower portion of the door such that the door opened by the elastic device is opened further. The cam device may include the upper cam 210 coupled to the lower portion of the door so as to be rotatable together with the door and including the first inclined surface 211, and the lower cam 220 coupled to the lower hinge module 60 of the door and including a second inclined surface 221 on which the first inclined surface slidably moves to allow the door to be rotated in an opening direction of the in response to the door being opened by the elastic device.

The upper cam may further include the first planar portion 213 formed on one side of the first inclined surface, the second planar portion 215 formed on another side of the first inclined surface, and the locking portion 217 formed on an opposite side of the first inclined portion from the first planar surface.

The lower cam may further include the third planar portion 223 formed on one side of the second inclined surface, the fourth planar portion 225 formed on another side of the second inclined surface, and the stopper 227 formed on an opposite side of the fourth planar portion from the second inclined surface.

The first planar portion may contact the third planar portion based on the door being closed.

In response to the door being opened by the pusher by the first angle A1, the upper cam may be rotated by the first angle in the opening direction of the door while maintaining a state in which the first planar portion is in contact with the third planar portion.

In response to the door being opened by the elastic device by the second angle A2 and being opened by an angle greater than the first angle and less than the second angle, the upper cam may be rotated such that the first planar portion slidably moves along the second inclined plane.

The upper cam may be rotated such that the first inclined plane slidably moves along the second inclined plane, thereby opening the door.

In response to the first inclined surface slidably moving along the second inclined surface and then the first planar portion contacting the fourth planar portion, the upper cam may stop rotating and the door may stop in a state where the door is opened by the third angle A3.

In response to a force being transmitted to the door in the opening direction of the door while the door is opened by the third angle, the upper cam may be rotated such that the first planar portion moves along the fourth planar portion, and in response to the locking portion being caught by the stopper, the door may stop in a fully open state.

The cabinet may include the upper hinge module 50 coupled to an upper portion of the cabinet and including the hinge shaft 55 allowing the door to be rotatably coupled to the cabinet, and the door may include the door cap 80 coupled to an upper portion of the door and including the hinge hole 83 to which the hinge shaft is rotatably coupled.

The upper hinge module may further include the guide shaft 230 protruding toward the door at a portion adjacent to the hinge shaft, and the door cap may further include the guide hole 240 formed along a circumference of the hinge hole to allow the guide shaft to be inserted, and configured to guide the guide shaft in response to opening or closing of the door.

The guide hole may be formed such that its width gradually decreases in a direction from a front of the door toward a rear of the door.

The guide hole may further include the first portion 241 adjacent to the front of the door and having the largest width, the second portion 243 adjacent to the rear of the door and having the smallest width, and the third portion 245 formed between the first portion and the second portion and having a width equal to a thickness of the guide shaft.

Based on the door being closed, the guide shaft may be positioned at the first portion of the guide hole, based on the door being opened, the guide shaft may move along the guide hole from the first portion to the second portion, and based on the door being opened by the cam device, the guide shaft may move along the guide hole and movement thereof may be restricted based on the guide shaft being positioned at the third portion.

A force may be transmitted to the door in the opening direction of the door while the guide shaft is positioned at the third portion, the guide shaft may move to the second portion, and the movement thereof may be restricted based on the guide shaft being positioned at the second portion.

According to an embodiment of the present disclosure, a refrigerator may include the cabinet 10 including the storage compartment 20, the door 30 rotatably coupled to the cabinet and configured to open or close the storage compartment, the pusher 91 movable in a forward-to-backward direction on the cabinet and configured to push the door such that the door is opened by the first angle A1, the elastic device 100 configured to be compressed in response to the door being opened by the pusher and transmit the compressed elastic force to the door such that the door is opened by the second angle A2 greater than the first angle, and the cam device 200 at a lower portion of the door and configured to transmit an additional opening force to the door such that the door opened by the elastic device is opened by the third angle A3 greater than the second angle.

The cam device may include the upper cam 210 coupled to a lower end of the door so as to rotate together with the door, and the upper cam may include the first inclined surface 211, the first planar portion 213 formed on one side of the first inclined surface, the second planar portion 215 formed on the other side of the first inclined surface, and the locking portion 217 formed on the opposite side of the first inclined portion from the first planar surface.

The cam device may further include the lower cam 220 coupled to the lower hinge module 60 of the door so as to be positioned on the lower portion of the upper cam, and the lower cam may include the second inclined surface 221 on which the first inclined surface slidably moves to allow the door to be rotated in an opening direction of the in response to the door being opened by the elastic device, the third planar portion 223 formed on one side of the second inclined surface, the fourth planar portion 225 formed on the other side of the second inclined surface, and the stopper 227 formed on the opposite side of the fourth planar portion from the second inclined surface.

The cabinet may include the upper hinge module 50 coupled to an upper portion of the cabinet and including the hinge shaft 55 allowing the door to be rotatably coupled to the cabinet, and the guide shaft 230 protruding toward the door at a portion adjacent to the hinge shaft.

The above door may include the door cap 80 coupled to an upper portion of the door and including the hinge hole 83 to which the hinge shaft is rotatably coupled, and the guide hole 240 formed along a circumference of the hinge hole to guide the guide shaft in response to opening or closing of the door and formed such that the width thereof gradually decreases along a direction in which the guide shaft moves in response to the opening of the door.

According to various embodiments of the present disclosure, the door may be opened to 90 degrees by the device for automatically opening the door.

Further, according to various embodiments of the present disclosure, the door may be stopped in a state in which the door is opened to 90 degrees by the device for automatically opening the door.

The effects to be obtained from the present disclosure are not limited to those mentioned above, and other effects not mentioned will be clearly understood by those skilled in the art to which the present disclosure belongs from the description below.

While the present disclosure has been particularly described with reference to exemplary embodiments, it should be understood by those of skilled in the art that various changes in form and details may be made without departing from the spirit and scope of the present disclosure.

The invention claimed is:

1. A refrigerator comprising:

a cabinet including a storage compartment;

a lower hinge module;

a door coupled to the cabinet by the lower hinge module, and configured to be rotatable to open and close the storage compartment;

a pusher configured to push the door, when the storage compartment is closed, so that the door is rotated in an opening direction;

an elastic device configured to be compressed as the door is rotated by a first angle by being pushed by the pusher, and to transmit a compressed elastic force to the door so that the door is rotated farther than the first angle in the opening direction; and a cam device including:

an upper cam with a first inclined surface, and a lower cam with a second inclined surface, wherein the cam device is configured so that:

the upper cam is coupled to a lower portion of the door so as to be rotatable together with the door, the lower cam is coupled to the lower hinge module, and after the elastic device transmits the compressed elastic force to the door, the first inclined surface of the upper cam slidably moves on the second inclined surface of the lower cam to farther rotate the door in the opening direction.

2. The refrigerator of claim 1, wherein the upper cam includes:

a first planar portion at a first side of the first inclined surface, a second planar portion at a second side of the first inclined surface, and a locking portion at a side of the first planar portion opposite to the first inclined surface.

3. The refrigerator of claim 2, wherein the lower cam includes:

a third planar portion at a first side of the second inclined surface, a fourth planar portion at a second side of the second inclined surface, and a stopper at a side of the fourth planar portion opposite to the second inclined surface.

4. The refrigerator of claim 3, wherein the first planar portion contacts the third planar portion based on the storage compartment being closed by the door.

5. The refrigerator of claim 4, wherein in response to the door being rotated by the pusher by the first angle, the upper cam is rotated by the first angle in the opening direction while maintaining a state in which the first planar portion of the upper cam is in contact with the third planar portion of the lower cam.

6. The refrigerator of claim 5, wherein in response to the door being rotated by the elastic device from the first angle to a second angle greater than the first angle, while the door is rotated from the first angle to the second angle the upper cam is rotated such that the first planar portion of the upper cam slidably moves along the second inclined surface of the lower cam.

7. The refrigerator of claim 6, wherein in response to the door being rotated to the second angle by the elastic device, the upper cam is rotated as the first inclined surface of the upper cam slidably moves along the second inclined surface of the lower cam, thereby farther rotating the door in the opening direction.

8. The refrigerator of claim 7, wherein in response to the first inclined surface of the upper cam slidably moving along the second inclined surface of the lower cam, and then the first planar portion of the upper cam contacting the fourth planar portion of the lower cam, the upper cam stops rotating and the door stops in a state where the door is rotated by a third angle in the opening direction.

9. The refrigerator of claim 8, wherein in response to a rotational force being transmitted to the door in the opening direction while the door is rotated by the third angle in the opening direction, the upper cam is rotated such that the first planar portion moves along the fourth planar portion until the locking portion of the upper cam contacts the stopper of the lower cam to stop rotation of the door in a fully open state.

10. The refrigerator of claim 1, wherein the cabinet includes an upper hinge module coupled to an upper portion of the cabinet, the upper hinge module including a hinge shaft to which the door is coupled to the cabinet so as to be rotatable, and the door includes a door cap coupled to an upper portion of the door, and the door cap including a hinge hole to receive the hinge shaft.

11. The refrigerator of claim 10, wherein the upper hinge module includes a guide shaft protruding toward the door, and the door cap includes a guide hole formed along a circumference of the hinge hole to receive the guide shaft, and configured to be guided by the guide shaft in response to rotation of the door to open and close the storage compartment.

12. The refrigerator of claim 11, wherein a width of the guide hole gradually decreases in a direction from a front of the door toward a rear of the door.

13. The refrigerator of claim 12, wherein the guide hole includes:

a first portion closest to the front of the door and where the width of the guide hole is largest, a second portion closest to the rear of the door and where the width of the guide hole is smallest, and a third portion formed between the first portion and the second portion, and where the width of the guide hole is equal to a thickness of the guide shaft.

14. The refrigerator of claim 13, wherein based on the door being positioned to close the storage compartment, the guide shaft is positioned at the first portion of the guide hole, based on the door being rotated to open the storage compartment, the guide hole is moved along the guide shaft so that a position of the guide shaft changes from the first portion to the third portion, and based on the door being rotated in the opening direction by the cam device, the guide hole is moved along the guide shaft until movement of the guide hole is restricted based on the guide shaft being positioned at the second portion.

15. The refrigerator of claim 14, wherein based on a rotational force being transmitted to the door in the opening direction while the guide shaft is positioned at the third portion, the guide hole is moved along the guide shaft until the guide shaft is in the second portion, and farther rotational movement of the door in the opening direction is then restricted based on the guide shaft being positioned at the second portion.

* * * * *